(12) United States Patent
Dean et al.

(10) Patent No.: US 11,568,348 B1
(45) Date of Patent: Jan. 31, 2023

(54) PRE-DATA BREACH MONITORING

(71) Applicant: ConsumerInfo.com, Inc., Costa Mesa, CA (US)

(72) Inventors: Michael John Dean, Torrance, CA (US); Mark Joseph Kapczynski, Santa Monica, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 0 days.

(21) Appl. No.: 17/313,775

(22) Filed: May 6, 2021

Related U.S. Application Data

(63) Continuation of application No. 16/657,057, filed on Oct. 18, 2019, now Pat. No. 11,030,562, which is a continuation of application No. 13/665,636, filed on Oct. 31, 2012, now abandoned.

(60) Provisional application No. 61/553,761, filed on Oct. 31, 2011.

(51) Int. Cl.
| | | |
|---|---|---|
| *G06Q 30/00* | (2012.01) | |
| *G06Q 10/06* | (2012.01) | |
| *G06Q 50/26* | (2012.01) | |
| *G06Q 10/10* | (2012.01) | |
| *G06F 16/958* | (2019.01) | |
| *G06Q 50/00* | (2012.01) | |
| *G06F 21/60* | (2013.01) | |
| *G06Q 30/02* | (2012.01) | |

(52) U.S. Cl.
CPC ....... *G06Q 10/0635* (2013.01); *G06F 16/958* (2019.01); *G06F 21/604* (2013.01); *G06Q 10/105* (2013.01); *G06Q 30/0205* (2013.01); *G06Q 50/01* (2013.01); *G06Q 50/265* (2013.01)

(58) Field of Classification Search
USPC .............. 705/37, 38, 7.28, 39, 40; 719/328; 717/108; 709/227; 235/375, 380, 383; 340/540
See application file for complete search history.

(56) References Cited

U.S. PATENT DOCUMENTS

| | | |
|---|---|---|
| 2,074,513 A | 3/1937 | Mills |
| 3,316,395 A | 4/1967 | Lavin et al. |
| 3,752,904 A | 8/1973 | Waterbury |
| 4,163,290 A | 7/1979 | Sutherlin et al. |

(Continued)

FOREIGN PATENT DOCUMENTS

| | | |
|---|---|---|
| CA | 3 058 653 | 4/2020 |
| CN | 104877993 | 9/2015 |

(Continued)

OTHER PUBLICATIONS

The Scourge of Internet Personal Data Collection; 2013 International Conference on Availability, Reliability and Security (pp. 821-828); Esma Aimeur, Manuel Lafond; Sep. 2, 2013. (Year: 2013).*

(Continued)

*Primary Examiner* — Tien C Nguyen
(74) *Attorney, Agent, or Firm* — Knobbe, Martens, Olson & Bear, LLP

(57) ABSTRACT

A method for providing pre-data breach monitoring provides information to businesses that is useful to predict portions of the company data that may not be secured well enough and other risks associated with data breaches, such as employees that may not be trustworthy.

20 Claims, 12 Drawing Sheets

(56) References Cited

U.S. PATENT DOCUMENTS

| | | |
|---|---|---|
| 5,274,547 A | 12/1993 | Zoffel et al. |
| 5,323,315 A | 6/1994 | Highbloom |
| 5,386,104 A | 1/1995 | Sime |
| 5,414,833 A | 5/1995 | Hershey et al. |
| 5,454,030 A | 9/1995 | de Oliveira et al. |
| 5,504,675 A | 4/1996 | Cragun et al. |
| 5,563,783 A | 10/1996 | Stolfo et al. |
| 5,590,038 A | 12/1996 | Pitroda |
| 5,627,886 A | 5/1997 | Bowman |
| 5,640,577 A | 6/1997 | Scharmer |
| 5,659,731 A | 8/1997 | Gustafson |
| 5,666,528 A | 9/1997 | Thai |
| 5,679,940 A | 10/1997 | Templeton et al. |
| 5,696,907 A | 12/1997 | Tom |
| 5,696,965 A | 12/1997 | Dedrick |
| 5,739,512 A | 4/1998 | Tognazzini |
| 5,742,775 A | 4/1998 | King |
| 5,745,654 A | 4/1998 | Titan |
| 5,752,242 A | 5/1998 | Havens |
| 5,754,632 A | 5/1998 | Smith |
| 5,754,939 A | 5/1998 | Herz et al. |
| 5,774,692 A | 6/1998 | Boyer et al. |
| 5,774,868 A | 6/1998 | Cragun et al. |
| 5,793,497 A | 8/1998 | Funk |
| 5,797,136 A | 8/1998 | Boyer et al. |
| 5,809,478 A | 9/1998 | Greco et al. |
| 5,812,840 A | 9/1998 | Shwartz |
| 5,819,226 A | 10/1998 | Gopinathan et al. |
| 5,819,260 A | 10/1998 | Lu et al. |
| 5,822,741 A | 10/1998 | Fischthal |
| 5,822,750 A | 10/1998 | Jou et al. |
| 5,825,884 A | 10/1998 | Zdepski et al. |
| 5,828,837 A | 10/1998 | Eikland |
| 5,832,068 A | 11/1998 | Smith |
| 5,842,178 A | 11/1998 | Giovannoli |
| 5,844,218 A | 12/1998 | Kawan et al. |
| 5,870,721 A | 2/1999 | Norris |
| 5,872,921 A | 2/1999 | Zahariev et al. |
| 5,878,403 A | 3/1999 | DeFrancesco |
| 5,879,297 A | 3/1999 | Haynor et al. |
| 5,884,289 A | 3/1999 | Anderson et al. |
| 5,893,090 A | 4/1999 | Friedman et al. |
| 5,912,839 A | 6/1999 | Ovshinsky et al. |
| 5,913,196 A | 6/1999 | Talmor et al. |
| 5,943,666 A | 8/1999 | Kleewein et al. |
| 5,950,179 A | 9/1999 | Buchanan et al. |
| 5,956,693 A | 9/1999 | Geerlings |
| 5,961,593 A | 10/1999 | Gabber et al. |
| 5,963,932 A | 10/1999 | Jakobsson et al. |
| 5,987,440 A | 11/1999 | O'Neil et al. |
| 5,999,907 A | 12/1999 | Donner |
| 5,999,940 A | 12/1999 | Ranger |
| 6,023,694 A | 2/2000 | Kouchi et al. |
| 6,029,139 A | 2/2000 | Cunningham et al. |
| 6,029,149 A | 2/2000 | Dykstra et al. |
| 6,029,154 A | 2/2000 | Pettitt |
| 6,029,194 A | 2/2000 | Tilt |
| 6,038,551 A | 3/2000 | Barlow et al. |
| 6,044,357 A | 3/2000 | Garg |
| 6,055,570 A | 4/2000 | Nielsen |
| 6,073,106 A | 6/2000 | Rozen et al. |
| 6,073,140 A | 6/2000 | Morgan et al. |
| 6,094,643 A | 7/2000 | Anderson et al. |
| 6,119,103 A | 9/2000 | Basch et al. |
| 6,125,985 A | 10/2000 | Amdahl et al. |
| 6,142,283 A | 11/2000 | Amdahl et al. |
| 6,144,957 A | 11/2000 | Cohen et al. |
| 6,144,988 A | 11/2000 | Kappel |
| 6,157,707 A | 12/2000 | Baulier et al. |
| 6,182,219 B1 | 1/2001 | Feldbau et al. |
| 6,208,720 B1 | 3/2001 | Curtis et al. |
| 6,223,171 B1 | 4/2001 | Chaudhuri et al. |
| 6,249,228 B1 | 6/2001 | Shirk et al. |
| 6,253,202 B1 | 6/2001 | Gilmour |
| 6,253,203 B1 | 6/2001 | O'Flaherty et al. |
| 6,254,000 B1 | 7/2001 | Degen et al. |
| 6,263,447 B1 | 7/2001 | French et al. |
| 6,269,349 B1 | 7/2001 | Aieta et al. |
| 6,282,658 B2 | 8/2001 | French et al. |
| 6,285,983 B1 | 9/2001 | Jenkins |
| 6,285,987 B1 | 9/2001 | Roth et al. |
| 6,292,795 B1 | 9/2001 | Peters et al. |
| 6,304,869 B1 | 10/2001 | Moore et al. |
| 6,311,169 B2 | 10/2001 | Duhon |
| 6,317,783 B1 | 11/2001 | Freishtat et al. |
| 6,321,339 B1 | 11/2001 | French et al. |
| 6,330,546 B1 | 12/2001 | Gopinathan et al. |
| 6,339,769 B1 | 1/2002 | Cochrane et al. |
| 6,366,903 B1 | 4/2002 | Agrawal et al. |
| 6,397,197 B1 | 5/2002 | Gindlesperger |
| 6,418,436 B1 | 7/2002 | Degen et al. |
| 6,424,956 B1 | 7/2002 | Werbos |
| 6,448,889 B1 | 9/2002 | Hudson |
| 6,456,984 B1 | 9/2002 | Demoff et al. |
| 6,457,012 B1 | 9/2002 | Jatkowski |
| 6,463,533 B1 | 10/2002 | Calamera et al. |
| 6,496,819 B1 | 12/2002 | Bello et al. |
| 6,496,936 B1 | 12/2002 | French et al. |
| 6,505,193 B1 | 1/2003 | Musgrave et al. |
| 6,510,415 B1 | 1/2003 | Talmor et al. |
| 6,513,018 B1 | 1/2003 | Culhane |
| 6,523,041 B1 | 2/2003 | Morgan et al. |
| 6,532,459 B1 | 3/2003 | Berson |
| 6,542,894 B1 | 4/2003 | Lee et al. |
| 6,543,683 B2 | 4/2003 | Hoffman |
| 6,553,495 B1 | 4/2003 | Johansson et al. |
| 6,571,334 B1 | 5/2003 | Feldbau et al. |
| 6,574,623 B1 | 6/2003 | Laung et al. |
| 6,581,059 B1 | 6/2003 | Barrett et al. |
| 6,597,775 B2 | 7/2003 | Lawyer et al. |
| 6,601,173 B1 | 7/2003 | Mohler |
| 6,612,488 B2 | 9/2003 | Suzuki |
| 6,615,193 B1 | 9/2003 | Kingdon et al. |
| 6,658,393 B1 | 12/2003 | Basch et al. |
| 6,662,023 B1 | 12/2003 | Helle |
| 6,696,941 B2 | 2/2004 | Baker |
| 6,700,220 B2 | 3/2004 | Bayeur et al. |
| 6,714,918 B2 | 3/2004 | Hillmer et al. |
| 6,735,572 B2 | 5/2004 | Landesmann |
| 6,740,875 B1 | 5/2004 | Ishikawa et al. |
| 6,748,426 B1 | 6/2004 | Shaffer et al. |
| 6,751,626 B2 | 6/2004 | Brown et al. |
| 6,754,665 B1 | 6/2004 | Futagami et al. |
| 6,766,946 B2 | 7/2004 | Iida et al. |
| 6,796,497 B2 | 9/2004 | Benkert et al. |
| 6,804,346 B1 | 10/2004 | Mewhinney |
| 6,811,082 B2 | 11/2004 | Wong |
| 6,829,711 B1 | 12/2004 | Kwok et al. |
| 6,845,448 B1 | 1/2005 | Chaganti et al. |
| 6,850,606 B2 | 2/2005 | Lawyer et al. |
| 6,850,895 B2 | 2/2005 | Brodersen et al. |
| 6,857,073 B2 | 2/2005 | French et al. |
| 6,866,586 B2 | 3/2005 | Oberberger et al. |
| 6,871,287 B1 | 3/2005 | Ellingson |
| 6,873,979 B2 | 3/2005 | Fishman et al. |
| 6,898,574 B1 | 5/2005 | Regan |
| 6,907,408 B2 | 6/2005 | Angel |
| 6,908,030 B2 | 6/2005 | Rajasekaran et al. |
| 6,910,624 B1 | 6/2005 | Natsuno |
| 6,913,194 B2 | 7/2005 | Suzuki |
| 6,918,038 B1 | 7/2005 | Smith et al. |
| 6,920,435 B2 | 7/2005 | Hoffman et al. |
| 6,928,546 B1 | 8/2005 | Nanavati et al. |
| 6,930,707 B2 | 8/2005 | Bates et al. |
| 6,934,849 B2 | 8/2005 | Kramer et al. |
| 6,934,858 B2 | 8/2005 | Woodhill |
| 6,950,858 B2 | 9/2005 | Ogami |
| 6,965,881 B1 | 11/2005 | Brickell et al. |
| 6,965,997 B2 | 11/2005 | Dutta |
| 6,973,462 B2 | 12/2005 | Dattero et al. |
| 6,973,575 B2 | 12/2005 | Arnold |
| 6,983,379 B1 | 1/2006 | Spalink et al. |
| 6,983,381 B2 | 1/2006 | Jerdonek |
| 6,983,882 B2 | 1/2006 | Cassone |

(56) References Cited

U.S. PATENT DOCUMENTS

| | | |
|---|---|---|
| 6,985,887 B1 | 1/2006 | Sunstein et al. |
| 6,988,085 B2 | 1/2006 | Hedy |
| 6,991,174 B2 | 1/2006 | Zuili |
| 6,993,659 B2 | 1/2006 | Milgramm et al. |
| 7,003,504 B1 | 2/2006 | Angus et al. |
| 7,007,174 B2 | 2/2006 | Wheeler et al. |
| 7,028,052 B2 | 4/2006 | Chapman et al. |
| 7,035,855 B1 | 4/2006 | Kilger et al. |
| 7,046,139 B2 | 5/2006 | Kuhn et al. |
| 7,050,989 B1 | 5/2006 | Hurt et al. |
| 7,069,240 B2 | 6/2006 | Spero et al. |
| 7,082,435 B1 | 7/2006 | Guzman et al. |
| 7,083,090 B2 | 8/2006 | Zuili |
| 7,089,592 B2 | 8/2006 | Adjaoute et al. |
| 7,092,891 B2 | 8/2006 | Maus et al. |
| 7,104,444 B2 | 9/2006 | Suzuki |
| 7,158,622 B2 | 1/2007 | Lawyer et al. |
| 7,162,640 B2 | 1/2007 | Heath et al. |
| 7,174,335 B2 | 2/2007 | Kameda |
| 7,185,016 B1 | 2/2007 | Rasmussen |
| 7,188,078 B2 | 3/2007 | Arnett et al. |
| 7,200,602 B2 | 4/2007 | Jonas |
| 7,203,653 B1 | 4/2007 | McIntosh |
| 7,212,995 B2 | 5/2007 | Schulkins |
| 7,222,779 B1 | 5/2007 | Pineda-Sanchez et al. |
| 7,225,977 B2 | 6/2007 | Davis |
| 7,234,156 B2 | 6/2007 | French et al. |
| 7,234,160 B2 | 6/2007 | Vogel et al. |
| 7,240,059 B2 | 7/2007 | Bayliss et al. |
| 7,240,363 B1 | 7/2007 | Ellingson |
| 7,246,067 B2 | 7/2007 | Austin et al. |
| 7,246,740 B2 | 7/2007 | Swift et al. |
| 7,249,048 B1 | 7/2007 | O'Flaherty |
| 7,254,560 B2 | 8/2007 | Singhal |
| 7,263,506 B2 | 8/2007 | Lee et al. |
| 7,272,591 B1 | 9/2007 | Ghazal et al. |
| 7,272,728 B2 | 9/2007 | Pierson et al. |
| 7,272,857 B1 | 9/2007 | Everhart |
| 7,277,869 B2 | 10/2007 | Starkman |
| 7,277,875 B2 | 10/2007 | Serrano-Morales et al. |
| 7,277,900 B1 | 10/2007 | Ganesh et al. |
| 7,283,974 B2 | 10/2007 | Katz et al. |
| 7,289,607 B2 | 10/2007 | Bhargava et al. |
| 7,290,704 B1 | 11/2007 | Ball et al. |
| 7,298,873 B2 | 11/2007 | Miller, Jr. et al. |
| 7,310,743 B1 | 12/2007 | Gagne et al. |
| 7,314,162 B2 | 1/2008 | Carr et al. |
| 7,314,167 B1 | 1/2008 | Kiliccote |
| 7,330,871 B2 | 2/2008 | Barber |
| 7,333,635 B2 | 2/2008 | Tsantes et al. |
| 7,340,042 B2 | 3/2008 | Cluff et al. |
| 7,343,149 B2 | 3/2008 | Benco |
| 7,356,516 B2 | 4/2008 | Richey et al. |
| 7,370,044 B2 | 5/2008 | Mulhern et al. |
| 7,370,351 B1 | 5/2008 | Ramachandran et al. |
| 7,373,335 B2 | 5/2008 | Cleghorn et al. |
| 7,376,618 B1 | 5/2008 | Anderson et al. |
| 7,383,227 B2 | 6/2008 | Weinflash et al. |
| 7,383,988 B2 | 6/2008 | Slonecker, Jr. |
| 7,386,448 B1 | 6/2008 | Poss et al. |
| 7,386,506 B2 | 6/2008 | Aoki et al. |
| 7,392,534 B2 | 6/2008 | Lu et al. |
| 7,395,273 B2 | 7/2008 | Khan et al. |
| 7,398,915 B1 | 7/2008 | Pineda-Sanchez et al. |
| 7,403,942 B1 | 7/2008 | Bayliss |
| 7,406,715 B2 | 7/2008 | Clapper |
| 7,412,228 B2 | 8/2008 | Barclay et al. |
| 7,418,431 B1 | 8/2008 | Nies et al. |
| 7,421,442 B2 | 9/2008 | Gelb et al. |
| 7,424,439 B1 | 9/2008 | Fayyad et al. |
| 7,428,509 B2 | 9/2008 | Klebanoff |
| 7,433,855 B2 | 10/2008 | Gavan et al. |
| 7,433,864 B2 * | 10/2008 | Malik ............... G06F 21/6245 |
| 7,438,226 B2 | 10/2008 | Helsper et al. |
| 7,444,518 B1 | 10/2008 | Dharmarajan et al. |
| 7,451,113 B1 | 11/2008 | Kasower |
| 7,457,401 B2 | 11/2008 | Lawyer et al. |
| 7,458,508 B1 | 12/2008 | Shao et al. |
| 7,460,857 B2 | 12/2008 | Roach, Jr. |
| 7,466,235 B1 | 12/2008 | Kolb et al. |
| 7,467,127 B1 | 12/2008 | Baccash et al. |
| 7,467,401 B2 | 12/2008 | Cicchitto |
| 7,478,157 B2 | 1/2009 | Bohrer et al. |
| 7,480,631 B1 | 1/2009 | Merced et al. |
| 7,481,363 B2 | 1/2009 | Zuili |
| 7,490,052 B2 | 2/2009 | Kilger et al. |
| 7,490,356 B2 | 2/2009 | Lieblich et al. |
| 7,497,374 B2 | 3/2009 | Helsper et al. |
| 7,509,117 B2 | 3/2009 | Yum |
| 7,512,221 B2 | 3/2009 | Toms |
| 7,519,558 B2 | 4/2009 | Ballard et al. |
| 7,522,060 B1 | 4/2009 | Tumperi et al. |
| 7,529,698 B2 | 5/2009 | Joao |
| 7,533,179 B2 | 5/2009 | Tarquini et al. |
| 7,533,808 B2 | 5/2009 | Song et al. |
| 7,536,346 B2 | 5/2009 | Aliffi et al. |
| 7,540,021 B2 | 5/2009 | Page |
| 7,542,993 B2 | 6/2009 | Satterfield et al. |
| 7,543,739 B2 | 6/2009 | Brown et al. |
| 7,543,740 B2 | 6/2009 | Greene et al. |
| 7,546,271 B1 | 6/2009 | Chmielewski et al. |
| 7,548,886 B2 | 6/2009 | Kirkland et al. |
| 7,552,467 B2 | 6/2009 | Lindsay |
| 7,562,093 B2 | 7/2009 | Gelb et al. |
| 7,562,184 B2 | 7/2009 | Henmi et al. |
| 7,562,814 B1 | 7/2009 | Shao et al. |
| 7,568,616 B2 | 8/2009 | Zuili |
| 7,575,157 B2 | 8/2009 | Barnhardt et al. |
| 7,580,884 B2 | 8/2009 | Cook |
| 7,581,112 B2 | 8/2009 | Brown et al. |
| 7,584,146 B1 | 9/2009 | Duhon |
| 7,587,366 B2 | 9/2009 | Grim, III et al. |
| 7,587,368 B2 | 9/2009 | Felsher |
| 7,591,425 B1 | 9/2009 | Zuili et al. |
| 7,593,889 B2 | 9/2009 | Raines et al. |
| 7,593,891 B2 | 9/2009 | Kornegay et al. |
| 7,594,019 B2 | 9/2009 | Clapper |
| 7,603,701 B2 | 10/2009 | Gaucas |
| 7,606,401 B2 | 10/2009 | Hoffman et al. |
| 7,606,725 B2 | 10/2009 | Robertson et al. |
| 7,606,790 B2 | 10/2009 | Levy |
| 7,610,216 B1 | 10/2009 | May et al. |
| 7,610,229 B1 | 10/2009 | Kornegay |
| 7,610,243 B2 | 10/2009 | Haggerty et al. |
| 7,620,596 B2 | 11/2009 | Knudson et al. |
| 7,623,844 B2 | 11/2009 | Herrmann et al. |
| 7,630,924 B1 | 12/2009 | Collins et al. |
| 7,630,932 B2 | 12/2009 | Danaher et al. |
| 7,636,853 B2 | 12/2009 | Cluts et al. |
| 7,644,868 B2 | 1/2010 | Hare |
| 7,647,344 B2 | 1/2010 | Skurtovich, Jr. et al. |
| 7,647,645 B2 | 1/2010 | Edeki et al. |
| 7,653,593 B2 | 1/2010 | Zarikian et al. |
| 7,657,431 B2 | 2/2010 | Hayakawa |
| 7,668,769 B2 | 2/2010 | Baker et al. |
| 7,668,840 B2 | 2/2010 | Bayliss et al. |
| 7,668,921 B2 | 2/2010 | Proux et al. |
| 7,672,865 B2 | 3/2010 | Kumar et al. |
| 7,672,924 B1 | 3/2010 | Scheurich et al. |
| 7,672,926 B2 | 3/2010 | Ghazal et al. |
| 7,673,793 B2 | 3/2010 | Greene et al. |
| 7,676,418 B1 | 3/2010 | Chung et al. |
| 7,676,433 B1 | 3/2010 | Ross et al. |
| 7,685,096 B2 | 3/2010 | Margolus et al. |
| 7,686,214 B1 | 3/2010 | Shao et al. |
| 7,689,007 B2 | 3/2010 | Bous et al. |
| 7,689,505 B2 | 3/2010 | Kasower |
| 7,689,506 B2 | 3/2010 | Fei et al. |
| 7,690,032 B1 | 3/2010 | Peirce |
| 7,698,445 B2 | 4/2010 | Fitzpatrick et al. |
| 7,701,364 B1 | 4/2010 | Zilberman |
| 7,702,550 B2 | 4/2010 | Perg et al. |
| 7,707,122 B2 | 4/2010 | Hull et al. |
| 7,707,163 B2 | 4/2010 | Anzalone et al. |

(56) References Cited

U.S. PATENT DOCUMENTS

| | | |
|---|---|---|
| 7,708,190 B2 | 5/2010 | Brandt et al. |
| 7,708,200 B2 | 5/2010 | Helsper et al. |
| 7,711,635 B2 | 5/2010 | Steele et al. |
| 7,711,636 B2 | 5/2010 | Robida et al. |
| 7,720,750 B2 | 5/2010 | Brody |
| 7,725,300 B2 | 5/2010 | Pinto et al. |
| 7,734,523 B1 | 6/2010 | Cui et al. |
| 7,735,125 B1 | 6/2010 | Alvarez et al. |
| 7,739,139 B2 | 6/2010 | Robertson et al. |
| 7,739,707 B2 | 6/2010 | Sie et al. |
| 7,742,982 B2 | 6/2010 | Chaudhuri et al. |
| 7,747,480 B1 | 6/2010 | Agresta et al. |
| 7,747,520 B2 | 6/2010 | Livermore et al. |
| 7,747,521 B2 | 6/2010 | Serio |
| 7,747,559 B2 | 6/2010 | Leitner et al. |
| 7,752,084 B2 | 7/2010 | Pettitt |
| 7,752,236 B2 | 7/2010 | Williams et al. |
| 7,752,554 B2 | 7/2010 | Biggs et al. |
| 7,756,783 B2 | 7/2010 | Crooks |
| 7,761,379 B2 | 7/2010 | Zoldi et al. |
| 7,761,384 B2 | 7/2010 | Madhogarhia |
| 7,765,311 B2 | 7/2010 | Itabashi et al. |
| 7,769,696 B2 | 8/2010 | Yoda |
| 7,774,270 B1 | 8/2010 | MacCloskey |
| 7,778,885 B1 | 8/2010 | Semprevivo et al. |
| 7,779,456 B2 | 8/2010 | Dennis et al. |
| 7,779,457 B2 | 8/2010 | Taylor |
| 7,783,281 B1 | 8/2010 | Cook et al. |
| 7,783,515 B1 | 8/2010 | Kumar et al. |
| 7,787,869 B2 | 8/2010 | Rice et al. |
| 7,788,184 B2 | 8/2010 | Kane |
| 7,792,715 B1 | 9/2010 | Kasower |
| 7,792,864 B1 | 9/2010 | Rice et al. |
| 7,792,903 B2 | 9/2010 | Fischer et al. |
| 7,793,835 B1 | 9/2010 | Coggeshall et al. |
| 7,797,725 B2 | 9/2010 | Lunt et al. |
| 7,801,811 B1 | 9/2010 | Merrell et al. |
| 7,801,828 B2 | 9/2010 | Candella et al. |
| 7,802,104 B2 | 9/2010 | Dickinson |
| 7,805,362 B1 | 9/2010 | Merrell et al. |
| 7,805,391 B2 | 9/2010 | Friedlander et al. |
| 7,809,797 B2 | 10/2010 | Cooley et al. |
| 7,813,944 B1 | 10/2010 | Luk et al. |
| 7,827,115 B2 | 11/2010 | Weller et al. |
| 7,832,006 B2 | 11/2010 | Chen et al. |
| 7,835,983 B2 | 11/2010 | Lefner et al. |
| 7,840,459 B1 | 11/2010 | Loftesness et al. |
| 7,841,004 B1 | 11/2010 | Balducci et al. |
| 7,841,008 B1 | 11/2010 | Cole et al. |
| 7,844,520 B1 | 11/2010 | Franklin |
| 7,848,987 B2 | 12/2010 | Haig |
| 7,849,029 B2 | 12/2010 | Crooks et al. |
| 7,853,493 B2 | 12/2010 | DeBie et al. |
| 7,853,518 B2 | 12/2010 | Cagan |
| 7,853,526 B2 | 12/2010 | Milana |
| 7,853,533 B2 | 12/2010 | Eisen |
| 7,853,998 B2 | 12/2010 | Blaisdell et al. |
| 7,856,397 B2 | 12/2010 | Whipple et al. |
| 7,856,494 B2 | 12/2010 | Kulkarni |
| 7,860,769 B2 | 12/2010 | Benson |
| 7,860,783 B2 | 12/2010 | Yang et al. |
| 7,865,427 B2 | 1/2011 | Wright et al. |
| 7,865,439 B2 | 1/2011 | Seifert et al. |
| 7,865,937 B1 | 1/2011 | White et al. |
| 7,870,078 B2 | 1/2011 | Clark et al. |
| 7,870,599 B2 | 1/2011 | Pemmaraju |
| 7,873,382 B2 | 1/2011 | Rydgren et al. |
| 7,874,488 B2 | 1/2011 | Parkinson |
| 7,877,304 B1 | 1/2011 | Coulter |
| 7,877,784 B2 | 1/2011 | Chow et al. |
| 7,882,548 B2 | 2/2011 | Heath et al. |
| 7,890,433 B2 | 2/2011 | Singhal |
| 7,904,360 B2 | 3/2011 | Evans |
| 7,904,367 B2 | 3/2011 | Chung et al. |
| 7,908,242 B1 | 3/2011 | Achanta |
| 7,909,246 B2 | 3/2011 | Hogg et al. |
| 7,912,865 B2 | 3/2011 | Akerman et al. |
| 7,917,715 B2 | 3/2011 | Tallman, Jr. |
| 7,925,582 B1 | 4/2011 | Kornegay et al. |
| 7,929,951 B2 | 4/2011 | Stevens et al. |
| 7,933,835 B2 | 4/2011 | Keane et al. |
| 7,941,363 B2 | 5/2011 | Tanaka et al. |
| 7,945,515 B2 | 5/2011 | Zoldi et al. |
| 7,950,577 B1 | 5/2011 | Daniel |
| 7,958,046 B2 | 6/2011 | Doerner et al. |
| 7,961,857 B2 | 6/2011 | Zoldi et al. |
| 7,962,404 B1 | 6/2011 | Metzger, II et al. |
| 7,962,467 B2 | 6/2011 | Howard et al. |
| 7,970,679 B2 | 6/2011 | Kasower |
| 7,970,698 B2 | 6/2011 | Gupta et al. |
| 7,970,701 B2 | 6/2011 | Lewis et al. |
| 7,971,246 B1 | 6/2011 | Emigh et al. |
| 7,975,299 B1 | 7/2011 | Balducci et al. |
| 7,983,932 B2 | 7/2011 | Kane |
| 7,983,976 B2 | 7/2011 | Nafeh et al. |
| 7,983,979 B2 | 7/2011 | Holland, IV |
| 7,984,849 B2 | 7/2011 | Berghel et al. |
| 7,988,043 B2 | 8/2011 | Davis |
| 7,991,201 B2 | 8/2011 | Bous et al. |
| 7,991,689 B1 | 8/2011 | Brunzell et al. |
| 7,991,716 B2 | 8/2011 | Crooks et al. |
| 7,991,751 B2 | 8/2011 | Peled et al. |
| 7,991,901 B2 | 8/2011 | Tarquini et al. |
| 7,995,994 B2 | 8/2011 | Khetawat et al. |
| 7,996,521 B2 | 8/2011 | Chamberlain et al. |
| 7,996,912 B2 | 8/2011 | Spalink et al. |
| 8,001,034 B2 | 8/2011 | Chung et al. |
| 8,001,042 B1 | 8/2011 | Brunzell et al. |
| 8,001,153 B2 | 8/2011 | Skurtovich, Jr. et al. |
| 8,001,597 B2 | 8/2011 | Crooks |
| 8,005,749 B2 | 8/2011 | Ginsberg |
| 8,006,291 B2 | 8/2011 | Headley et al. |
| 8,009,873 B2 | 8/2011 | Chapman |
| 8,019,678 B2 | 9/2011 | Wright et al. |
| 8,020,763 B1 | 9/2011 | Kowalchyk et al. |
| 8,024,263 B2 | 9/2011 | Zarikian et al. |
| 8,024,264 B2 | 9/2011 | Chaudhuri et al. |
| 8,024,271 B2 | 9/2011 | Grant |
| 8,027,439 B2 | 9/2011 | Zoldi et al. |
| 8,027,518 B2 | 9/2011 | Baker et al. |
| 8,027,947 B2 | 9/2011 | Hinsz et al. |
| 8,028,168 B2 | 9/2011 | Smithies et al. |
| 8,028,326 B2 | 9/2011 | Palmer et al. |
| 8,028,329 B2 | 9/2011 | Whitcomb |
| 8,028,896 B2 | 10/2011 | Carter et al. |
| 8,032,448 B2 | 10/2011 | Anderson et al. |
| 8,032,449 B2 | 10/2011 | Hu et al. |
| 8,032,927 B2 | 10/2011 | Ross |
| 8,037,097 B2 | 10/2011 | Guo et al. |
| 8,037,512 B2 | 10/2011 | Wright et al. |
| 8,041,597 B2 | 10/2011 | Li et al. |
| 8,042,159 B2 | 10/2011 | Basner et al. |
| 8,042,193 B1 | 10/2011 | Piliouras |
| 8,049,596 B2 | 11/2011 | Sato |
| 8,055,667 B2 | 11/2011 | Levy |
| 8,056,128 B1 | 11/2011 | Dingle et al. |
| 8,058,972 B2 | 11/2011 | Mohanty |
| 8,060,424 B2 | 11/2011 | Kasower |
| 8,060,915 B2 | 11/2011 | Voice et al. |
| 8,060,916 B2 | 11/2011 | Bajaj et al. |
| 8,065,233 B2 | 11/2011 | Lee et al. |
| 8,065,264 B1 | 11/2011 | Achanta |
| 8,065,525 B2 | 11/2011 | Zilberman |
| 8,069,053 B2 | 11/2011 | Gervais et al. |
| 8,069,084 B2 | 11/2011 | Mackouse |
| 8,069,256 B2 | 11/2011 | Rasti |
| 8,069,485 B2 | 11/2011 | Carter |
| 8,073,785 B1 | 12/2011 | Candella et al. |
| 8,078,569 B2 | 12/2011 | Kennel |
| 8,090,648 B2 | 1/2012 | Zoldi et al. |
| 8,095,458 B2 | 1/2012 | Peterson et al. |
| 8,104,679 B2 | 1/2012 | Brown |
| 8,116,731 B2 | 2/2012 | Buhrmann et al. |
| 8,121,962 B2 | 2/2012 | Vaiciulis et al. |

(56) References Cited

U.S. PATENT DOCUMENTS

| | | |
|---|---|---|
| 8,127,986 B1 | 3/2012 | Taylor et al. |
| 8,131,615 B2 | 3/2012 | Diev et al. |
| 8,151,327 B2 | 4/2012 | Eisen |
| 8,195,549 B2 | 6/2012 | Kasower |
| 8,201,257 B1 | 6/2012 | Andres et al. |
| 8,204,774 B2 | 6/2012 | Chwast et al. |
| 8,214,262 B1 | 7/2012 | Semprevivo et al. |
| 8,214,285 B2 | 7/2012 | Hu et al. |
| 8,224,723 B2 | 7/2012 | Bosch et al. |
| 8,225,395 B2 | 7/2012 | Atwood et al. |
| 8,234,498 B2 | 7/2012 | Britti et al. |
| 8,239,677 B2 | 8/2012 | Colson |
| 8,244,629 B2 | 8/2012 | Lewis et al. |
| 8,255,978 B2 | 8/2012 | Dick |
| 8,260,914 B1 | 9/2012 | Ranjan |
| 8,280,805 B1 | 10/2012 | Abrahams et al. |
| 8,280,833 B2 | 10/2012 | Miltonberger |
| 8,285,613 B1 | 10/2012 | Coulter |
| 8,285,636 B2 | 10/2012 | Curry et al. |
| 8,296,225 B2 | 10/2012 | Maddipati et al. |
| 8,296,229 B1 | 10/2012 | Yellin et al. |
| 8,296,250 B2 | 10/2012 | Crooks et al. |
| 8,312,033 B1 | 11/2012 | McMillan |
| 8,321,952 B2 | 11/2012 | Spalink et al. |
| 8,332,338 B2 | 12/2012 | Vaiciulis et al. |
| 8,346,593 B2 | 1/2013 | Fanelli |
| 8,355,896 B2 | 1/2013 | Kumar et al. |
| 8,355,967 B2 | 1/2013 | Debie et al. |
| 8,359,278 B2 | 1/2013 | Domenikos et al. |
| 8,364,588 B2 | 1/2013 | Celka et al. |
| 8,374,973 B2 | 2/2013 | Herbrich et al. |
| 8,386,377 B1 | 2/2013 | Xiong et al. |
| 8,429,070 B2 | 4/2013 | Hu et al. |
| 8,463,919 B2 | 6/2013 | Tarquini et al. |
| 8,468,090 B2 | 6/2013 | Lesandro et al. |
| 8,478,674 B1 | 7/2013 | Kapczynski et al. |
| 8,489,479 B2 | 7/2013 | Slater et al. |
| 8,510,329 B2 | 8/2013 | Balkir et al. |
| 8,515,828 B1 | 8/2013 | Wolf et al. |
| 8,515,844 B2 | 8/2013 | Kasower |
| 8,516,439 B2 | 8/2013 | Brass et al. |
| 8,543,499 B2 | 9/2013 | Haggerty et al. |
| 8,548,137 B2 | 10/2013 | Zoldi et al. |
| 8,548,903 B2 | 10/2013 | Becker |
| 8,549,590 B1 | 10/2013 | de Villiers Prichard et al. |
| 8,559,607 B2 | 10/2013 | Zoldi et al. |
| 8,567,669 B2 | 10/2013 | Griegel et al. |
| 8,578,496 B1 | 11/2013 | Krishnappa |
| 8,583,593 B1 | 11/2013 | Achanta |
| 8,626,671 B2 | 1/2014 | Federgreen |
| 8,630,938 B2 | 1/2014 | Cheng et al. |
| 8,639,920 B2 | 1/2014 | Stack et al. |
| 8,645,301 B2 | 2/2014 | Vaiciulis et al. |
| 8,671,115 B2 | 3/2014 | Skurtovich, Jr. et al. |
| 8,676,684 B2 | 3/2014 | Newman et al. |
| 8,676,726 B2 | 3/2014 | Hore et al. |
| 8,682,755 B2 | 3/2014 | Bucholz et al. |
| 8,683,586 B2 | 3/2014 | Crooks |
| 8,694,427 B2 | 4/2014 | Maddipati et al. |
| 8,707,445 B2 | 4/2014 | Sher-Jan et al. |
| 8,725,613 B1 | 5/2014 | Celka et al. |
| 8,763,133 B2 | 6/2014 | Sher-Jan et al. |
| 8,776,225 B2 | 7/2014 | Pierson et al. |
| 8,781,953 B2 | 7/2014 | Kasower |
| 8,781,975 B2 | 7/2014 | Bennett et al. |
| 8,793,777 B2 | 7/2014 | Colson |
| 8,805,836 B2 | 8/2014 | Hore et al. |
| 8,812,387 B1 | 8/2014 | Samler et al. |
| 8,819,793 B2 | 8/2014 | Gottschalk, Jr. |
| 8,824,648 B2 | 9/2014 | Zoldi et al. |
| 8,826,393 B2 | 9/2014 | Eisen |
| 8,862,514 B2 | 10/2014 | Eisen |
| 8,862,526 B2 | 10/2014 | Miltonberger |
| 8,909,664 B2 | 12/2014 | Hopkins |
| 8,918,891 B2 | 12/2014 | Coggeshall et al. |
| 8,949,981 B1 * | 2/2015 | Trollope ............ H04L 67/02 709/224 |
| 9,118,646 B2 | 8/2015 | Pierson et al. |
| 9,191,403 B2 | 11/2015 | Zoldi et al. |
| 9,194,899 B2 | 11/2015 | Zoldi et al. |
| 9,196,004 B2 | 11/2015 | Eisen |
| 9,210,156 B1 | 12/2015 | Little et al. |
| 9,235,728 B2 | 1/2016 | Gottschalk, Jr. et al. |
| 9,251,541 B2 | 2/2016 | Celka et al. |
| 9,256,624 B2 | 2/2016 | Skurtovich, Jr. et al. |
| 9,280,658 B2 | 3/2016 | Coggeshall et al. |
| 9,361,597 B2 | 6/2016 | Britton et al. |
| 9,367,520 B2 | 6/2016 | Zhao et al. |
| 9,390,384 B2 | 7/2016 | Eisen |
| 9,412,141 B2 | 8/2016 | Prichard et al. |
| 9,483,650 B2 | 11/2016 | Sher-Jan et al. |
| 9,489,497 B2 | 11/2016 | MaGill et al. |
| 9,531,738 B2 | 12/2016 | Zoldi et al. |
| 9,558,368 B2 | 1/2017 | Gottschalk, Jr. et al. |
| 9,595,066 B2 | 3/2017 | Samler et al. |
| 9,652,802 B1 | 5/2017 | Kasower |
| 9,704,195 B2 | 7/2017 | Zoldi |
| 9,710,523 B2 | 7/2017 | Skurtovich, Jr. et al. |
| 9,710,868 B2 | 7/2017 | Gottschalk, Jr. et al. |
| 9,754,256 B2 | 9/2017 | Britton et al. |
| 9,754,311 B2 | 9/2017 | Eisen |
| 9,760,885 B1 | 9/2017 | Ramalingam et al. |
| 9,773,227 B2 | 9/2017 | Zoldi et al. |
| 9,781,147 B2 | 10/2017 | Sher-Jan et al. |
| 9,953,321 B2 | 4/2018 | Zoldi et al. |
| 10,043,213 B2 | 8/2018 | Straub et al. |
| 10,089,679 B2 | 10/2018 | Eisen |
| 10,089,686 B2 | 10/2018 | Straub et al. |
| 10,102,530 B2 | 10/2018 | Zoldi et al. |
| 10,115,153 B2 | 10/2018 | Zoldi et al. |
| 10,152,736 B2 | 12/2018 | Yang et al. |
| 10,217,163 B2 | 2/2019 | Straub et al. |
| 10,242,540 B2 | 3/2019 | Chen et al. |
| 10,339,527 B1 | 7/2019 | Coleman et al. |
| 10,373,061 B2 | 8/2019 | Kennel et al. |
| 10,430,604 B2 | 10/2019 | Spinelli et al. |
| 10,438,308 B2 | 10/2019 | Prichard et al. |
| 10,497,034 B2 | 12/2019 | Yang et al. |
| 10,510,025 B2 | 12/2019 | Zoldi et al. |
| 10,528,948 B2 | 1/2020 | Zoldi et al. |
| 10,579,938 B2 | 3/2020 | Zoldi et al. |
| 10,592,982 B2 | 3/2020 | Samler et al. |
| 10,593,004 B2 | 3/2020 | Gottschalk, Jr. et al. |
| 10,692,058 B2 | 6/2020 | Zoldi et al. |
| 10,699,028 B1 | 6/2020 | Kennedy et al. |
| 10,713,711 B2 | 7/2020 | Zoldi |
| 10,769,290 B2 | 9/2020 | Crawford et al. |
| 10,791,136 B2 | 9/2020 | Zoldi et al. |
| 10,896,381 B2 | 1/2021 | Zoldi et al. |
| 10,896,472 B1 | 1/2021 | Stack et al. |
| 10,902,426 B2 | 1/2021 | Zoldi et al. |
| 10,909,617 B2 | 2/2021 | Kasower |
| 10,977,363 B2 | 4/2021 | Leitner et al. |
| 10,990,979 B1 | 4/2021 | Coleman et al. |
| 10,999,298 B2 | 5/2021 | Eisen |
| 11,023,963 B2 | 6/2021 | Zoldi et al. |
| 11,030,562 B1 | 6/2021 | Dean et al. |
| 11,037,229 B2 | 6/2021 | Zoldi et al. |
| 2001/0000536 A1 | 4/2001 | Tarin |
| 2001/0014868 A1 | 8/2001 | Herz et al. |
| 2001/0014878 A1 | 8/2001 | Mitra et al. |
| 2001/0027413 A1 | 10/2001 | Bhutta |
| 2001/0029470 A1 | 10/2001 | Schultz et al. |
| 2001/0034631 A1 | 10/2001 | Kiselik |
| 2001/0039523 A1 | 11/2001 | Iwamoto |
| 2001/0039532 A1 | 11/2001 | Coleman, Jr. et al. |
| 2001/0049620 A1 | 12/2001 | Blasko |
| 2002/0004736 A1 | 1/2002 | Roundtree et al. |
| 2002/0010664 A1 | 1/2002 | Rabideau et al. |
| 2002/0010684 A1 | 1/2002 | Moskowitz |
| 2002/0010701 A1 | 1/2002 | Kosciuszko |
| 2002/0013899 A1 | 1/2002 | Faul |
| 2002/0019804 A1 | 2/2002 | Sutton |
| 2002/0019938 A1 | 2/2002 | Aarons |

(56) References Cited

U.S. PATENT DOCUMENTS

| | | |
|---|---|---|
| 2002/0026519 A1 | 2/2002 | Itabashi et al. |
| 2002/0032635 A1 | 3/2002 | Harris et al. |
| 2002/0035684 A1 | 3/2002 | Vogel et al. |
| 2002/0040344 A1 | 4/2002 | Preiser et al. |
| 2002/0042879 A1 | 4/2002 | Gould et al. |
| 2002/0049738 A1 | 4/2002 | Epstein |
| 2002/0052841 A1 | 5/2002 | Guthrie et al. |
| 2002/0052884 A1 | 5/2002 | Farber et al. |
| 2002/0059521 A1 | 5/2002 | Tasler |
| 2002/0062185 A1 | 5/2002 | Runge et al. |
| 2002/0062281 A1 | 5/2002 | Singhal |
| 2002/0069122 A1 | 6/2002 | Yun et al. |
| 2002/0073044 A1 | 6/2002 | Singhal |
| 2002/0077178 A1 | 6/2002 | Oberberger et al. |
| 2002/0077964 A1 | 6/2002 | Brody et al. |
| 2002/0080256 A1 | 6/2002 | Bates et al. |
| 2002/0087460 A1 | 7/2002 | Hornung |
| 2002/0091650 A1 | 7/2002 | Ellis |
| 2002/0099649 A1 | 7/2002 | Lee et al. |
| 2002/0099824 A1 | 7/2002 | Bender et al. |
| 2002/0111910 A1 | 8/2002 | Walsh |
| 2002/0119824 A1 | 8/2002 | Allen |
| 2002/0128962 A1 | 9/2002 | Kasower |
| 2002/0130176 A1 | 9/2002 | Suzuki |
| 2002/0138417 A1 | 9/2002 | Lawrence |
| 2002/0138751 A1 | 9/2002 | Dutta |
| 2002/0147695 A1 | 10/2002 | Khedkar et al. |
| 2002/0156676 A1 | 10/2002 | Ahrens et al. |
| 2002/0161664 A1 | 10/2002 | Shaya et al. |
| 2002/0161711 A1 | 10/2002 | Sartor et al. |
| 2002/0169747 A1 | 11/2002 | Chapman et al. |
| 2002/0173994 A1 | 11/2002 | Ferguson, III |
| 2002/0178112 A1 | 11/2002 | Goeller et al. |
| 2002/0184509 A1 | 12/2002 | Scheidt et al. |
| 2002/0188544 A1 | 12/2002 | Wizon et al. |
| 2002/0198824 A1 | 12/2002 | Cook |
| 2003/0004879 A1 | 1/2003 | Demoff et al. |
| 2003/0009418 A1 | 1/2003 | Green et al. |
| 2003/0009426 A1 | 1/2003 | Ruiz-Sanchez |
| 2003/0018549 A1 | 1/2003 | Fei et al. |
| 2003/0033261 A1 | 2/2003 | Knegendorf |
| 2003/0046554 A1 | 3/2003 | Leydier et al. |
| 2003/0048904 A1 | 3/2003 | Wang et al. |
| 2003/0050882 A1 | 3/2003 | Degen et al. |
| 2003/0057278 A1 | 3/2003 | Wong |
| 2003/0061163 A1 | 3/2003 | Durfield |
| 2003/0065563 A1 | 4/2003 | Elliott et al. |
| 2003/0070101 A1 | 4/2003 | Buscemi |
| 2003/0078877 A1 | 4/2003 | Beirne et al. |
| 2003/0093366 A1 | 5/2003 | Halper et al. |
| 2003/0097320 A1 | 5/2003 | Gordon |
| 2003/0097342 A1 | 5/2003 | Whittingtom |
| 2003/0105696 A1 | 6/2003 | Kalotay et al. |
| 2003/0115133 A1 | 6/2003 | Bian |
| 2003/0143980 A1 | 7/2003 | Choi et al. |
| 2003/0149744 A1 | 8/2003 | Bierre et al. |
| 2003/0153299 A1 | 8/2003 | Perfit et al. |
| 2003/0158751 A1 | 8/2003 | Suresh et al. |
| 2003/0158960 A1 | 8/2003 | Engberg |
| 2003/0163416 A1 | 8/2003 | Kitajima |
| 2003/0182214 A1 | 9/2003 | Taylor |
| 2003/0195859 A1 | 10/2003 | Lawrence |
| 2003/0200447 A1 | 10/2003 | Sjoblom |
| 2003/0208428 A1 | 11/2003 | Raynes et al. |
| 2003/0212654 A1 | 11/2003 | Harper et al. |
| 2003/0222500 A1 | 12/2003 | Bayeur et al. |
| 2003/0225656 A1 | 12/2003 | Aberman et al. |
| 2003/0225692 A1 | 12/2003 | Bosch et al. |
| 2003/0225742 A1 | 12/2003 | Tenner et al. |
| 2003/0229892 A1 | 12/2003 | Sardera |
| 2003/0233278 A1 | 12/2003 | Marshall |
| 2003/0236738 A1 | 12/2003 | Lange et al. |
| 2004/0004117 A1 | 1/2004 | Suzuki |
| 2004/0005912 A1 | 1/2004 | Hubbe et al. |
| 2004/0006488 A1 | 1/2004 | Fitall et al. |
| 2004/0010698 A1 | 1/2004 | Rolfe |
| 2004/0024709 A1 | 2/2004 | Yu et al. |
| 2004/0026496 A1 | 2/2004 | Zuili |
| 2004/0030649 A1 | 2/2004 | Nelson et al. |
| 2004/0039586 A1 | 2/2004 | Garvey et al. |
| 2004/0044628 A1 | 3/2004 | Mathew et al. |
| 2004/0054619 A1 | 3/2004 | Watson et al. |
| 2004/0059653 A1 | 3/2004 | Verkuylen et al. |
| 2004/0064401 A1 | 4/2004 | Palaghita et al. |
| 2004/0078324 A1 | 4/2004 | Lonnberg et al. |
| 2004/0098625 A1 | 5/2004 | Lagadec et al. |
| 2004/0103147 A1 | 5/2004 | Flesher et al. |
| 2004/0107363 A1 | 6/2004 | Monteverde |
| 2004/0110119 A1 | 6/2004 | Riconda et al. |
| 2004/0111305 A1 | 6/2004 | Gavan et al. |
| 2004/0111335 A1 | 6/2004 | Black et al. |
| 2004/0111358 A1 | 6/2004 | Lange et al. |
| 2004/0117235 A1 | 6/2004 | Shacham |
| 2004/0128227 A1 | 7/2004 | Whipple et al. |
| 2004/0128232 A1 | 7/2004 | Descloux |
| 2004/0133440 A1 | 7/2004 | Carolan et al. |
| 2004/0139025 A1 | 7/2004 | Coleman |
| 2004/0143526 A1 | 7/2004 | Monasterio et al. |
| 2004/0149820 A1 | 8/2004 | Zuili |
| 2004/0149827 A1 | 8/2004 | Zuili |
| 2004/0153330 A1 | 8/2004 | Miller et al. |
| 2004/0153448 A1 | 8/2004 | Cheng et al. |
| 2004/0153521 A1 | 8/2004 | Kogo |
| 2004/0153656 A1 | 8/2004 | Gluts et al. |
| 2004/0158520 A1 | 8/2004 | Noh |
| 2004/0158523 A1 | 8/2004 | Dort |
| 2004/0158723 A1 | 8/2004 | Root |
| 2004/0167793 A1 | 8/2004 | Masuoka et al. |
| 2004/0177046 A1 | 9/2004 | Ogram |
| 2004/0193538 A1 | 9/2004 | Raines |
| 2004/0199456 A1 | 10/2004 | Flint et al. |
| 2004/0199462 A1 | 10/2004 | Starrs |
| 2004/0199789 A1 | 10/2004 | Shaw et al. |
| 2004/0204948 A1 | 10/2004 | Singletary et al. |
| 2004/0220896 A1 | 11/2004 | Finlay et al. |
| 2004/0225594 A1 | 11/2004 | Nolan, III et al. |
| 2004/0230448 A1 | 11/2004 | Schaich |
| 2004/0230527 A1 | 11/2004 | Hansen et al. |
| 2004/0230534 A1 | 11/2004 | McGough |
| 2004/0230538 A1 | 11/2004 | Clifton et al. |
| 2004/0234117 A1 | 11/2004 | Tibor |
| 2004/0243514 A1 | 12/2004 | Wankmueller |
| 2004/0243518 A1 | 12/2004 | Clifton et al. |
| 2004/0243567 A1 | 12/2004 | Levy |
| 2004/0250085 A1 | 12/2004 | Tattan et al. |
| 2004/0255127 A1 | 12/2004 | Arnouse |
| 2004/0260922 A1 | 12/2004 | Goodman et al. |
| 2005/0001028 A1 | 1/2005 | Zuili |
| 2005/0005168 A1 | 1/2005 | Dick |
| 2005/0010513 A1 | 1/2005 | Duckworth et al. |
| 2005/0010780 A1 | 1/2005 | Kane et al. |
| 2005/0021476 A1 | 1/2005 | Candella et al. |
| 2005/0021519 A1 | 1/2005 | Ghouri |
| 2005/0027983 A1 | 2/2005 | Klawon |
| 2005/0027995 A1 | 2/2005 | Menschik et al. |
| 2005/0038726 A1 | 2/2005 | Salomon et al. |
| 2005/0038737 A1 | 2/2005 | Norris |
| 2005/0039086 A1 | 2/2005 | Krishnamurthy et al. |
| 2005/0049991 A1 | 3/2005 | Aggarwal |
| 2005/0050577 A1 | 3/2005 | Westbrook et al. |
| 2005/0055231 A1 | 3/2005 | Lee |
| 2005/0058262 A1 | 3/2005 | Timmins et al. |
| 2005/0065874 A1 | 3/2005 | Lefner et al. |
| 2005/0065950 A1 | 3/2005 | Chaganti et al. |
| 2005/0071282 A1 | 3/2005 | Lu et al. |
| 2005/0075985 A1 | 4/2005 | Cartmell |
| 2005/0081052 A1 | 4/2005 | Washington |
| 2005/0086161 A1 | 4/2005 | Gallant |
| 2005/0091164 A1 | 4/2005 | Varble |
| 2005/0097039 A1 | 5/2005 | Kulcsar et al. |
| 2005/0097051 A1 | 5/2005 | Madill, Jr. et al. |
| 2005/0097364 A1 | 5/2005 | Edeki et al. |
| 2005/0102206 A1 | 5/2005 | Savasoglu et al. |
| 2005/0105719 A1 | 5/2005 | Huda |

(56) References Cited

U.S. PATENT DOCUMENTS

| | | |
|---|---|---|
| 2005/0125226 A1 | 6/2005 | Magee |
| 2005/0125686 A1 | 6/2005 | Brandt |
| 2005/0137899 A1 | 6/2005 | Davies et al. |
| 2005/0138391 A1 | 6/2005 | Mandalia et al. |
| 2005/0144143 A1 | 6/2005 | Freiberg |
| 2005/0154664 A1 | 7/2005 | Guy et al. |
| 2005/0154665 A1 | 7/2005 | Kerr |
| 2005/0154671 A1 | 7/2005 | Doan et al. |
| 2005/0165667 A1 | 7/2005 | Cox |
| 2005/0187948 A1 | 8/2005 | Monitzer et al. |
| 2005/0192008 A1 | 9/2005 | Desai et al. |
| 2005/0197953 A1 | 9/2005 | Broadbent et al. |
| 2005/0203885 A1 | 9/2005 | Chenevich et al. |
| 2005/0216953 A1 | 9/2005 | Ellingson |
| 2005/0229007 A1 | 10/2005 | Bolle et al. |
| 2005/0240578 A1 | 10/2005 | Biederman et al. |
| 2005/0242173 A1 | 11/2005 | Suzuki |
| 2005/0246338 A1 | 11/2005 | Bird |
| 2005/0251474 A1 | 11/2005 | Shinn et al. |
| 2005/0256809 A1 | 11/2005 | Sadri |
| 2005/0262014 A1 | 11/2005 | Fickes |
| 2005/0262158 A1 | 11/2005 | Sauermann |
| 2005/0273333 A1 | 12/2005 | Morin et al. |
| 2005/0273442 A1 | 12/2005 | Bennett et al. |
| 2005/0278542 A1 | 12/2005 | Pierson et al. |
| 2005/0279827 A1 | 12/2005 | Mascavage et al. |
| 2005/0279869 A1 | 12/2005 | Barklage |
| 2006/0004663 A1 | 1/2006 | Singhal |
| 2006/0014129 A1 | 1/2006 | Coleman et al. |
| 2006/0020611 A1 | 1/2006 | Gilbert et al. |
| 2006/0020814 A1* | 1/2006 | Lieblich .............. H04L 63/1425 713/182 |
| 2006/0032909 A1 | 2/2006 | Seegar |
| 2006/0041464 A1 | 2/2006 | Powers et al. |
| 2006/0045105 A1 | 3/2006 | Dobosz et al. |
| 2006/0047605 A1 | 3/2006 | Ahmad |
| 2006/0059073 A1 | 3/2006 | Walzak |
| 2006/0059110 A1 | 3/2006 | Madhok et al. |
| 2006/0064374 A1 | 3/2006 | Helsper et al. |
| 2006/0074798 A1 | 4/2006 | Din et al. |
| 2006/0074986 A1 | 4/2006 | Mallalieu et al. |
| 2006/0074991 A1 | 4/2006 | Lussier et al. |
| 2006/0080230 A1 | 4/2006 | Freiberg |
| 2006/0080263 A1 | 4/2006 | Willis et al. |
| 2006/0085454 A1 | 4/2006 | Blegen et al. |
| 2006/0089905 A1 | 4/2006 | Song et al. |
| 2006/0101508 A1 | 5/2006 | Taylor |
| 2006/0106605 A1 | 5/2006 | Saunders et al. |
| 2006/0112279 A1 | 5/2006 | Cohen et al. |
| 2006/0112280 A1 | 5/2006 | Cohen et al. |
| 2006/0129428 A1 | 6/2006 | Wennberg |
| 2006/0129481 A1 | 6/2006 | Bhatt et al. |
| 2006/0129840 A1 | 6/2006 | Milgramm et al. |
| 2006/0131390 A1 | 6/2006 | Kim |
| 2006/0136332 A1 | 6/2006 | Ziegler |
| 2006/0140460 A1 | 6/2006 | Coutts |
| 2006/0143073 A1 | 6/2006 | Engel et al. |
| 2006/0144924 A1 | 7/2006 | Stover |
| 2006/0149580 A1 | 7/2006 | Helsper et al. |
| 2006/0149674 A1 | 7/2006 | Cook et al. |
| 2006/0155573 A1 | 7/2006 | Hartunian |
| 2006/0161435 A1 | 7/2006 | Atef et al. |
| 2006/0161592 A1 | 7/2006 | Ertoz et al. |
| 2006/0173776 A1 | 8/2006 | Shalley et al. |
| 2006/0173792 A1 | 8/2006 | Glass |
| 2006/0177226 A1 | 8/2006 | Ellis, III |
| 2006/0178971 A1 | 8/2006 | Owen et al. |
| 2006/0179004 A1 | 8/2006 | Fuchs |
| 2006/0184440 A1 | 8/2006 | Britti et al. |
| 2006/0184585 A1 | 8/2006 | Grear et al. |
| 2006/0195351 A1 | 8/2006 | Bayburtian |
| 2006/0200855 A1 | 9/2006 | Willis |
| 2006/0202012 A1 | 9/2006 | Grano et al. |
| 2006/0204051 A1 | 9/2006 | Holland, IV |
| 2006/0206725 A1 | 9/2006 | Milgramm et al. |
| 2006/0212386 A1 | 9/2006 | Willey et al. |
| 2006/0218069 A1 | 9/2006 | Aberman et al. |
| 2006/0229961 A1 | 10/2006 | Lyftogt et al. |
| 2006/0239512 A1 | 10/2006 | Petrillo |
| 2006/0239513 A1 | 10/2006 | Song et al. |
| 2006/0242046 A1 | 10/2006 | Haggerty et al. |
| 2006/0242047 A1 | 10/2006 | Haggerty et al. |
| 2006/0253358 A1 | 11/2006 | Delgrosso et al. |
| 2006/0253583 A1 | 11/2006 | Dixon et al. |
| 2006/0255914 A1 | 11/2006 | Westman |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0273158 A1 | 12/2006 | Suzuki |
| 2006/0277043 A1 | 12/2006 | Tomes et al. |
| 2006/0277092 A1 | 12/2006 | Williams |
| 2006/0282285 A1 | 12/2006 | Helsper et al. |
| 2006/0282372 A1 | 12/2006 | Endres et al. |
| 2006/0282395 A1 | 12/2006 | Leibowitz |
| 2006/0287765 A1 | 12/2006 | Kraft |
| 2006/0288090 A1 | 12/2006 | Kraft |
| 2006/0294023 A1 | 12/2006 | Lu |
| 2007/0005508 A1 | 1/2007 | Chiang |
| 2007/0011100 A1 | 1/2007 | Libin et al. |
| 2007/0016500 A1 | 1/2007 | Chatterji et al. |
| 2007/0016521 A1 | 1/2007 | Wang |
| 2007/0016522 A1 | 1/2007 | Wang |
| 2007/0022141 A1 | 1/2007 | Singleton et al. |
| 2007/0022297 A1 | 1/2007 | Britti et al. |
| 2007/0038483 A1 | 2/2007 | Wood |
| 2007/0038497 A1 | 2/2007 | Britti et al. |
| 2007/0038568 A1 | 2/2007 | Greene et al. |
| 2007/0040017 A1 | 2/2007 | Kozlay |
| 2007/0040019 A1 | 2/2007 | Berghel et al. |
| 2007/0043577 A1 | 2/2007 | Kasower |
| 2007/0047770 A1 | 3/2007 | Swope et al. |
| 2007/0048765 A1 | 3/2007 | Abramson |
| 2007/0050638 A1 | 3/2007 | Rasti |
| 2007/0059442 A1 | 3/2007 | Sabeta |
| 2007/0061273 A1 | 3/2007 | Greene et al. |
| 2007/0067207 A1 | 3/2007 | Haggerty et al. |
| 2007/0067297 A1 | 3/2007 | Kublickis |
| 2007/0067437 A1 | 3/2007 | Sindambiwe |
| 2007/0072190 A1 | 3/2007 | Aggarwal |
| 2007/0073622 A1 | 3/2007 | Kane |
| 2007/0073630 A1 | 3/2007 | Greene et al. |
| 2007/0078786 A1 | 4/2007 | Bous et al. |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0087795 A1 | 4/2007 | Aletto et al. |
| 2007/0093234 A1 | 4/2007 | Willis et al. |
| 2007/0094137 A1 | 4/2007 | Phillips et al. |
| 2007/0094264 A1 | 4/2007 | Nair |
| 2007/0100774 A1 | 5/2007 | Abdon |
| 2007/0106582 A1 | 5/2007 | Baker et al. |
| 2007/0106611 A1 | 5/2007 | Larsen |
| 2007/0107050 A1 | 5/2007 | Selvarajan |
| 2007/0109103 A1 | 5/2007 | Jedrey et al. |
| 2007/0110282 A1 | 5/2007 | Millsapp |
| 2007/0112667 A1 | 5/2007 | Rucker |
| 2007/0112668 A1 | 5/2007 | Celano et al. |
| 2007/0118393 A1 | 5/2007 | Rosen et al. |
| 2007/0130070 A1 | 6/2007 | Williams |
| 2007/0155411 A1 | 7/2007 | Morrison |
| 2007/0157299 A1 | 7/2007 | Hare |
| 2007/0160458 A1 | 7/2007 | Yen |
| 2007/0168246 A1 | 7/2007 | Haggerty et al. |
| 2007/0168480 A1 | 7/2007 | Biggs et al. |
| 2007/0174208 A1 | 7/2007 | Black et al. |
| 2007/0179903 A1 | 8/2007 | Seinfeld et al. |
| 2007/0180209 A1 | 8/2007 | Tallman |
| 2007/0180263 A1 | 8/2007 | Delgrosso et al. |
| 2007/0186276 A1 | 8/2007 | McRae et al. |
| 2007/0192248 A1 | 8/2007 | West |
| 2007/0192853 A1 | 8/2007 | Shraim et al. |
| 2007/0198410 A1 | 8/2007 | Labgold et al. |

(56) References Cited

U.S. PATENT DOCUMENTS

| | | |
|---|---|---|
| 2007/0205266 A1 | 9/2007 | Carr et al. |
| 2007/0208669 A1 | 9/2007 | Rivette et al. |
| 2007/0214037 A1 | 9/2007 | Shubert et al. |
| 2007/0214365 A1 | 9/2007 | Cornett et al. |
| 2007/0219928 A1 | 9/2007 | Madhogarhia |
| 2007/0220594 A1 | 9/2007 | Tulsyan |
| 2007/0220611 A1 | 9/2007 | Socolow et al. |
| 2007/0226093 A1 | 9/2007 | Chan et al. |
| 2007/0226129 A1 | 9/2007 | Liao et al. |
| 2007/0233614 A1 | 10/2007 | McNelley et al. |
| 2007/0234427 A1 | 10/2007 | Gardner et al. |
| 2007/0244782 A1 | 10/2007 | Chimento |
| 2007/0244807 A1 | 10/2007 | Andringa et al. |
| 2007/0250459 A1 | 10/2007 | Schwarz et al. |
| 2007/0250704 A1 | 10/2007 | Hallam-Baker |
| 2007/0250920 A1 | 10/2007 | Lindsay |
| 2007/0261114 A1 | 11/2007 | Pomerantsev |
| 2007/0266439 A1 | 11/2007 | Kraft |
| 2007/0282730 A1 | 12/2007 | Carpenter et al. |
| 2007/0288355 A1 | 12/2007 | Roland et al. |
| 2007/0288360 A1 | 12/2007 | Seeklus |
| 2007/0288559 A1 | 12/2007 | Parsadayan |
| 2007/0291995 A1 | 12/2007 | Rivera |
| 2007/0292006 A1 | 12/2007 | Johnson |
| 2007/0294104 A1 | 12/2007 | Boaz et al. |
| 2007/0299759 A1 | 12/2007 | Kelly |
| 2008/0010203 A1 | 1/2008 | Grant |
| 2008/0010206 A1 | 1/2008 | Coleman |
| 2008/0010683 A1 | 1/2008 | Baddour et al. |
| 2008/0010687 A1 | 1/2008 | Gonen et al. |
| 2008/0015887 A1 | 1/2008 | Drabek et al. |
| 2008/0021804 A1 | 1/2008 | Deckoff |
| 2008/0027857 A1 | 1/2008 | Benson |
| 2008/0027858 A1 | 1/2008 | Benson |
| 2008/0033742 A1 | 2/2008 | Bernasconi |
| 2008/0052182 A1 | 2/2008 | Marshall |
| 2008/0052244 A1 | 2/2008 | Tsuei et al. |
| 2008/0059224 A1 | 3/2008 | Schechter |
| 2008/0059236 A1 | 3/2008 | Cartier |
| 2008/0059352 A1 | 3/2008 | Chandran |
| 2008/0059364 A1 | 3/2008 | Tidwell et al. |
| 2008/0059366 A1 | 3/2008 | Fou |
| 2008/0059449 A1 | 3/2008 | Webster et al. |
| 2008/0063172 A1 | 3/2008 | Ahuja et al. |
| 2008/0066188 A1 | 3/2008 | Kwak |
| 2008/0071882 A1 | 3/2008 | Hering et al. |
| 2008/0076386 A1 | 3/2008 | Khetawat et al. |
| 2008/0077526 A1 | 3/2008 | Arumugam |
| 2008/0098222 A1 | 4/2008 | Zilberman |
| 2008/0103798 A1 | 5/2008 | Domenikos et al. |
| 2008/0103799 A1 | 5/2008 | Domenikos et al. |
| 2008/0103800 A1* | 5/2008 | Domenikos ............ G06Q 40/02 705/318 |
| 2008/0103811 A1 | 5/2008 | Sosa |
| 2008/0103972 A1 | 5/2008 | Lanc |
| 2008/0104021 A1 | 5/2008 | Cai et al. |
| 2008/0104672 A1 | 5/2008 | Lunde et al. |
| 2008/0109875 A1 | 5/2008 | Kraft |
| 2008/0114837 A1 | 5/2008 | Biggs et al. |
| 2008/0115191 A1 | 5/2008 | Kim et al. |
| 2008/0120237 A1 | 5/2008 | Lin |
| 2008/0126116 A1 | 5/2008 | Singhai |
| 2008/0126233 A1 | 5/2008 | Hogan |
| 2008/0140576 A1 | 6/2008 | Lewis et al. |
| 2008/0147454 A1 | 6/2008 | Walker et al. |
| 2008/0154758 A1 | 6/2008 | Schattmaier et al. |
| 2008/0162202 A1 | 7/2008 | Khanna et al. |
| 2008/0162383 A1 | 7/2008 | Kraft |
| 2008/0167883 A1 | 7/2008 | Thavildar Khazaneh |
| 2008/0175360 A1 | 7/2008 | Schwarz et al. |
| 2008/0177655 A1 | 7/2008 | Zalik |
| 2008/0177841 A1 | 7/2008 | Sinn et al. |
| 2008/0189789 A1 | 8/2008 | Lamontagne |
| 2008/0195548 A1 | 8/2008 | Chu et al. |
| 2008/0205655 A1 | 8/2008 | Wilkins et al. |
| 2008/0208548 A1 | 8/2008 | Metzger et al. |
| 2008/0208610 A1 | 8/2008 | Thomas et al. |
| 2008/0208726 A1 | 8/2008 | Tsantes et al. |
| 2008/0208873 A1 | 8/2008 | Boehmer |
| 2008/0217400 A1 | 9/2008 | Portano |
| 2008/0228635 A1 | 9/2008 | Megdal et al. |
| 2008/0228775 A1 | 9/2008 | Abhyanker et al. |
| 2008/0243680 A1 | 10/2008 | Megdal et al. |
| 2008/0244717 A1 | 10/2008 | Jelatis et al. |
| 2008/0255922 A1 | 10/2008 | Feldman et al. |
| 2008/0255992 A1 | 10/2008 | Lin |
| 2008/0256613 A1 | 10/2008 | Grover |
| 2008/0263058 A1 | 10/2008 | Peden |
| 2008/0270209 A1 | 10/2008 | Mauseth et al. |
| 2008/0281737 A1 | 11/2008 | Fajardo |
| 2008/0281743 A1 | 11/2008 | Pettit |
| 2008/0282324 A1 | 11/2008 | Hoal |
| 2008/0288382 A1 | 11/2008 | Smith et al. |
| 2008/0288430 A1 | 11/2008 | Friedlander et al. |
| 2008/0288790 A1 | 11/2008 | Wilson |
| 2008/0294540 A1 | 11/2008 | Celka et al. |
| 2008/0294689 A1 | 11/2008 | Metzger et al. |
| 2008/0296367 A1 | 12/2008 | Parkinson |
| 2008/0296382 A1 | 12/2008 | Connell, II et al. |
| 2008/0300877 A1 | 12/2008 | Gilbert et al. |
| 2008/0306750 A1 | 12/2008 | Wunder et al. |
| 2008/0319889 A1 | 12/2008 | Hammad |
| 2008/0320575 A1 | 12/2008 | Gelb et al. |
| 2009/0007220 A1 | 1/2009 | Ormazabal et al. |
| 2009/0018934 A1 | 1/2009 | Peng et al. |
| 2009/0021349 A1 | 1/2009 | Errico et al. |
| 2009/0024417 A1 | 1/2009 | Marks et al. |
| 2009/0024505 A1 | 1/2009 | Patel et al. |
| 2009/0024636 A1 | 1/2009 | Shiloh |
| 2009/0024663 A1 | 1/2009 | McGovern |
| 2009/0026270 A1 | 1/2009 | Connell, II et al. |
| 2009/0031426 A1 | 1/2009 | Dal Lago et al. |
| 2009/0043637 A1 | 2/2009 | Eder |
| 2009/0043691 A1 | 2/2009 | Kasower |
| 2009/0044279 A1 | 2/2009 | Crawford et al. |
| 2009/0048877 A1 | 2/2009 | Binns et al. |
| 2009/0048957 A1 | 2/2009 | Celano |
| 2009/0055894 A1 | 2/2009 | Lorsch |
| 2009/0079539 A1 | 3/2009 | Johnson |
| 2009/0094311 A1 | 4/2009 | Awadallah et al. |
| 2009/0094674 A1 | 4/2009 | Schwartz et al. |
| 2009/0099960 A1 | 4/2009 | Robida et al. |
| 2009/0106150 A1 | 4/2009 | Pelegero et al. |
| 2009/0106153 A1 | 4/2009 | Ezra |
| 2009/0106846 A1 | 4/2009 | Dupray et al. |
| 2009/0112650 A1 | 4/2009 | Iwane |
| 2009/0119106 A1 | 5/2009 | Rajakumar et al. |
| 2009/0119299 A1 | 5/2009 | Rhodes |
| 2009/0125369 A1 | 5/2009 | Kloostra et al. |
| 2009/0125439 A1 | 5/2009 | Zarikian et al. |
| 2009/0125463 A1 | 5/2009 | Hido |
| 2009/0126013 A1 | 5/2009 | Atwood et al. |
| 2009/0138335 A1 | 5/2009 | Lieberman |
| 2009/0138391 A1 | 5/2009 | Dudley et al. |
| 2009/0141318 A1 | 6/2009 | Hughes |
| 2009/0150166 A1 | 6/2009 | Leite et al. |
| 2009/0150238 A1 | 6/2009 | Marsh et al. |
| 2009/0151005 A1 | 6/2009 | Bell et al. |
| 2009/0158404 A1 | 6/2009 | Hahn et al. |
| 2009/0164380 A1 | 6/2009 | Brown |
| 2009/0172815 A1 | 7/2009 | Gu et al. |
| 2009/0177670 A1 | 7/2009 | Grenier et al. |
| 2009/0182653 A1 | 7/2009 | Zimiles |
| 2009/0183259 A1 | 7/2009 | Rinek et al. |
| 2009/0199264 A1 | 8/2009 | Lang |
| 2009/0205032 A1 | 8/2009 | Hinton et al. |
| 2009/0206993 A1 | 8/2009 | Di Mambro et al. |
| 2009/0216560 A1 | 8/2009 | Siegel |
| 2009/0216747 A1 | 8/2009 | Li et al. |
| 2009/0217342 A1 | 8/2009 | Nadler |
| 2009/0222308 A1 | 9/2009 | Zoldi et al. |
| 2009/0222362 A1 | 9/2009 | Stood et al. |
| 2009/0222373 A1 | 9/2009 | Choudhuri et al. |
| 2009/0222374 A1 | 9/2009 | Choudhuri et al. |

(56) References Cited

U.S. PATENT DOCUMENTS

| | | |
|---|---|---|
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0222897 A1 | 9/2009 | Carow et al. |
| 2009/0224875 A1 | 9/2009 | Rabinowitz et al. |
| 2009/0224889 A1 | 9/2009 | Aggarwal et al. |
| 2009/0226056 A1 | 9/2009 | Vlachos et al. |
| 2009/0234665 A1 | 9/2009 | Conkel |
| 2009/0234738 A1 | 9/2009 | Britton et al. |
| 2009/0240609 A1 | 9/2009 | Cho et al. |
| 2009/0241168 A1 | 9/2009 | Readshaw |
| 2009/0241173 A1 | 9/2009 | Troyansky |
| 2009/0248198 A1 | 10/2009 | Siegel et al. |
| 2009/0248497 A1 | 10/2009 | Hueter |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0249451 A1 | 10/2009 | Su et al. |
| 2009/0254476 A1 | 10/2009 | Sharma et al. |
| 2009/0254484 A1 | 10/2009 | Forero et al. |
| 2009/0254656 A1 | 10/2009 | Vignisson et al. |
| 2009/0254971 A1 | 10/2009 | Herz et al. |
| 2009/0257595 A1 | 10/2009 | De Cesare et al. |
| 2009/0259470 A1 | 10/2009 | Chang |
| 2009/0259560 A1 | 10/2009 | Bachenheimer |
| 2009/0259588 A1 | 10/2009 | Lindsay |
| 2009/0259855 A1 | 10/2009 | de Cesare et al. |
| 2009/0261189 A1 | 10/2009 | Ellis, Jr. |
| 2009/0270126 A1 | 10/2009 | Liu |
| 2009/0271265 A1 | 10/2009 | Lay et al. |
| 2009/0271617 A1 | 10/2009 | Song et al. |
| 2009/0272801 A1 | 11/2009 | Connell, II et al. |
| 2009/0276244 A1 | 11/2009 | Baldwin, Jr. et al. |
| 2009/0281945 A1 | 11/2009 | Shakkarwar |
| 2009/0281951 A1 | 11/2009 | Shakkarwar |
| 2009/0289110 A1 | 11/2009 | Regen et al. |
| 2009/0300066 A1 | 12/2009 | Guo et al. |
| 2009/0307778 A1 | 12/2009 | Mardikar |
| 2009/0326972 A1 | 12/2009 | Washington |
| 2009/0327054 A1 | 12/2009 | Yao et al. |
| 2009/0328173 A1 | 12/2009 | Jakobson et al. |
| 2010/0024037 A1 | 1/2010 | Grzymala-Busse et al. |
| 2010/0030677 A1 | 2/2010 | Melik-Aslanian et al. |
| 2010/0031030 A1 | 2/2010 | Kao et al. |
| 2010/0037147 A1 | 2/2010 | Champion et al. |
| 2010/0037308 A1 | 2/2010 | Lin et al. |
| 2010/0042526 A1 | 2/2010 | Martinov |
| 2010/0043055 A1 | 2/2010 | Baumgart |
| 2010/0049803 A1 | 2/2010 | Ogilvie et al. |
| 2010/0070620 A1 | 3/2010 | Awadallah et al. |
| 2010/0077006 A1 | 3/2010 | El Emam et al. |
| 2010/0085146 A1 | 4/2010 | Johnson |
| 2010/0088233 A1 | 4/2010 | Tattan et al. |
| 2010/0088338 A1 | 4/2010 | Pavoni, Jr. et al. |
| 2010/0094664 A1 | 4/2010 | Bush et al. |
| 2010/0094758 A1 | 4/2010 | Chamberlain et al. |
| 2010/0094767 A1 | 4/2010 | Miltonberger |
| 2010/0094768 A1 | 4/2010 | Miltonberger |
| 2010/0094910 A1 | 4/2010 | Bayliss |
| 2010/0095357 A1 | 4/2010 | Willis et al. |
| 2010/0100406 A1 | 4/2010 | Lim |
| 2010/0100945 A1 | 4/2010 | Ozzie et al. |
| 2010/0107225 A1 | 4/2010 | Spencer et al. |
| 2010/0114724 A1 | 5/2010 | Ghosh et al. |
| 2010/0114744 A1 | 5/2010 | Gonen |
| 2010/0121767 A1 | 5/2010 | Coulter et al. |
| 2010/0130172 A1 | 5/2010 | Vendrow et al. |
| 2010/0131273 A1 | 5/2010 | Aley-Raz et al. |
| 2010/0132043 A1 | 5/2010 | Bjorn et al. |
| 2010/0145836 A1 | 6/2010 | Baker et al. |
| 2010/0145840 A1 | 6/2010 | Kasower |
| 2010/0158207 A1 | 6/2010 | Dhawan et al. |
| 2010/0169210 A1 | 7/2010 | Bous et al. |
| 2010/0169947 A1 | 7/2010 | Sarmah et al. |
| 2010/0174813 A1 | 7/2010 | Hildreth et al. |
| 2010/0185546 A1 | 7/2010 | Pollard |
| 2010/0188684 A1* | 7/2010 | Kumara ............... G06F 21/608 358/1.14 |
| 2010/0205662 A1 | 8/2010 | Ibrahim et al. |
| 2010/0217837 A1 | 8/2010 | Ansari et al. |
| 2010/0218255 A1 | 8/2010 | Ritman et al. |
| 2010/0228649 A1 | 9/2010 | Pettitt |
| 2010/0228657 A1 | 9/2010 | Kagarlis |
| 2010/0229225 A1 | 9/2010 | Sarmah et al. |
| 2010/0229230 A1 | 9/2010 | Edeki et al. |
| 2010/0229245 A1 | 9/2010 | Singhal |
| 2010/0241501 A1 | 9/2010 | Marshall |
| 2010/0250364 A1 | 9/2010 | Song et al. |
| 2010/0250411 A1 | 9/2010 | Rodski |
| 2010/0250509 A1* | 9/2010 | Andersen ............... G06Q 10/10 709/217 |
| 2010/0250955 A1 | 9/2010 | Trevithick et al. |
| 2010/0257577 A1 | 10/2010 | Grandison et al. |
| 2010/0268557 A1 | 10/2010 | Faith et al. |
| 2010/0268660 A1 | 10/2010 | Ekdahl |
| 2010/0274679 A1 | 10/2010 | Hammad |
| 2010/0274734 A1 | 10/2010 | Chung et al. |
| 2010/0275265 A1 | 10/2010 | Fiske et al. |
| 2010/0280882 A1 | 11/2010 | Faith et al. |
| 2010/0293090 A1* | 11/2010 | Domenikos .......... G06Q 40/025 705/325 |
| 2010/0293114 A1 | 11/2010 | Khan et al. |
| 2010/0302157 A1 | 12/2010 | Zilberman |
| 2010/0306101 A1 | 12/2010 | Lefner et al. |
| 2010/0313273 A1 | 12/2010 | Freas |
| 2010/0325035 A1 | 12/2010 | Hilgers et al. |
| 2010/0325442 A1 | 12/2010 | Petrone et al. |
| 2010/0332292 A1 | 12/2010 | Anderson |
| 2010/0332362 A1 | 12/2010 | Ramsey et al. |
| 2011/0004498 A1 | 1/2011 | Readshaw |
| 2011/0016042 A1 | 1/2011 | Cho et al. |
| 2011/0040629 A1 | 2/2011 | Chiu et al. |
| 2011/0040983 A1 | 2/2011 | Grzymala-Busse et al. |
| 2011/0047071 A1 | 2/2011 | Choudhuri et al. |
| 2011/0060905 A1 | 3/2011 | Stack et al. |
| 2011/0066547 A1 | 3/2011 | Clark et al. |
| 2011/0082768 A1 | 4/2011 | Eisen |
| 2011/0093383 A1 | 4/2011 | Haggerty et al. |
| 2011/0112958 A1 | 5/2011 | Haggerty et al. |
| 2011/0119291 A1 | 5/2011 | Rice |
| 2011/0126024 A1 | 5/2011 | Beatson et al. |
| 2011/0126275 A1 | 5/2011 | Anderson et al. |
| 2011/0131123 A1* | 6/2011 | Griffin ................ G06Q 40/00 705/35 |
| 2011/0145899 A1 | 6/2011 | Cao et al. |
| 2011/0164746 A1 | 7/2011 | Nice et al. |
| 2011/0166988 A1 | 7/2011 | Coulter |
| 2011/0178899 A1 | 7/2011 | Huszar |
| 2011/0184838 A1 | 7/2011 | Winters et al. |
| 2011/0184851 A1 | 7/2011 | Megdal et al. |
| 2011/0196791 A1 | 8/2011 | Dominguez |
| 2011/0219421 A1 | 9/2011 | Ullman et al. |
| 2011/0238566 A1 | 9/2011 | Santos |
| 2011/0260832 A1 | 10/2011 | Ross et al. |
| 2011/0276496 A1 | 11/2011 | Neville et al. |
| 2011/0282778 A1 | 11/2011 | Wright et al. |
| 2011/0289032 A1 | 11/2011 | Crooks et al. |
| 2011/0289322 A1 | 11/2011 | Rasti |
| 2011/0295721 A1 | 12/2011 | MacDonald |
| 2011/0295750 A1 | 12/2011 | Rammal |
| 2011/0296529 A1 | 12/2011 | Bhanoo et al. |
| 2011/0302412 A1 | 12/2011 | Deng et al. |
| 2011/0302641 A1 | 12/2011 | Hald et al. |
| 2012/0017266 A1 | 1/2012 | DiChiara et al. |
| 2012/0030080 A1 | 2/2012 | Slater et al. |
| 2012/0030771 A1 | 2/2012 | Pierson et al. |
| 2012/0036352 A1 | 2/2012 | Tovar et al. |

(56) References Cited

U.S. PATENT DOCUMENTS

| | | |
|---|---|---|
| 2012/0054592 A1 | 3/2012 | Jaffe et al. |
| 2012/0066073 A1 | 3/2012 | Dilip et al. |
| 2012/0066084 A1 | 3/2012 | Sneyders |
| 2012/0101939 A1 | 4/2012 | Kasower |
| 2012/0158574 A1 | 6/2012 | Brunzell et al. |
| 2012/0158654 A1 | 6/2012 | Behren et al. |
| 2012/0198556 A1* | 8/2012 | Patel .................... G06F 21/577 726/25 |
| 2012/0215682 A1 | 8/2012 | Lent et al. |
| 2012/0278227 A1 | 11/2012 | Kolo et al. |
| 2012/0278249 A1 | 11/2012 | Duggal et al. |
| 2012/0290660 A1 | 11/2012 | Rao et al. |
| 2013/0004033 A1 | 1/2013 | Trugenberger et al. |
| 2013/0018811 A1 | 1/2013 | Britti et al. |
| 2013/0031624 A1 | 1/2013 | Britti et al. |
| 2013/0132060 A1* | 5/2013 | Badhe ................ G06Q 10/0631 703/22 |
| 2013/0132151 A1 | 5/2013 | Stibel et al. |
| 2013/0173450 A1 | 7/2013 | Celka et al. |
| 2013/0185293 A1 | 7/2013 | Boback |
| 2013/0211986 A1 | 8/2013 | Debie et al. |
| 2013/0218797 A1 | 8/2013 | Prichard et al. |
| 2013/0332342 A1 | 12/2013 | Kasower |
| 2014/0007238 A1 | 1/2014 | Magee et al. |
| 2014/0058910 A1 | 2/2014 | Abeles |
| 2014/0149304 A1 | 5/2014 | Bucholz et al. |
| 2014/0214636 A1 | 7/2014 | Rajsky |
| 2014/0283097 A1 | 9/2014 | Allen et al. |
| 2014/0304822 A1 | 10/2014 | Sher-Jan et al. |
| 2015/0142595 A1 | 5/2015 | Acuña-Rohter |
| 2015/0161529 A1 | 6/2015 | Kondaji et al. |
| 2015/0186901 A1 | 7/2015 | Miltonberger |
| 2015/0199784 A1 | 7/2015 | Straub et al. |
| 2015/0295924 A1 | 10/2015 | Gottschalk, Jr. |
| 2016/0012561 A1 | 1/2016 | Lappenbusch et al. |
| 2016/0063278 A1 | 3/2016 | Kraska et al. |
| 2016/0063645 A1 | 3/2016 | Houseworth et al. |
| 2016/0071208 A1 | 3/2016 | Straub et al. |
| 2016/0086262 A1 | 3/2016 | Straub et al. |
| 2016/0210450 A1 | 7/2016 | Su |
| 2016/0328814 A1 | 11/2016 | Prichard et al. |
| 2016/0344758 A1 | 11/2016 | Cohen et al. |
| 2016/0379011 A1 | 12/2016 | Koike et al. |
| 2017/0099314 A1 | 4/2017 | Klatt et al. |
| 2017/0177683 A1 | 6/2017 | Koike et al. |
| 2017/0206376 A1 | 7/2017 | Sher-Jan |
| 2017/0270629 A1 | 9/2017 | Fitzgerald |
| 2017/0278182 A1 | 9/2017 | Kasower |
| 2017/0287065 A1 | 10/2017 | Samler et al. |
| 2017/0357971 A1 | 12/2017 | Pitz et al. |
| 2017/0374076 A1 | 12/2017 | Pierson et al. |
| 2018/0004978 A1 | 1/2018 | Hebert et al. |
| 2018/0130157 A1 | 5/2018 | Gottschalk, Jr. et al. |
| 2018/0322572 A1 | 11/2018 | Straub et al. |
| 2019/0073676 A1 | 3/2019 | Wang |
| 2019/0164173 A1 | 5/2019 | Liu et al. |
| 2019/0228178 A1 | 7/2019 | Sharma et al. |
| 2019/0311366 A1 | 10/2019 | Zoldi et al. |
| 2019/0377896 A1 | 12/2019 | Spinelli et al. |
| 2020/0134629 A1 | 4/2020 | Zoldi et al. |
| 2020/0143465 A1 | 5/2020 | Chilaka et al. |
| 2020/0145436 A1 | 5/2020 | Brown et al. |
| 2020/0151628 A1 | 5/2020 | Zoldi et al. |
| 2020/0242615 A1 | 7/2020 | Chandra et al. |
| 2020/0293684 A1 | 9/2020 | Harris et al. |
| 2020/0380112 A1 | 12/2020 | Allen |
| 2020/0396246 A1 | 12/2020 | Zoldi et al. |
| 2021/0021631 A1 | 1/2021 | Okutan et al. |
| 2021/0150532 A1 | 5/2021 | Zhang et al. |

FOREIGN PATENT DOCUMENTS

| | | |
|---|---|---|
| DE | 91 08 341 | 10/1991 |
| EP | 0 554 083 | 8/1993 |
| EP | 2 939 361 | 10/2019 |
| GB | 2 384 087 | 7/2003 |
| GB | 2 392 748 | 3/2004 |
| GB | 2 518 099 | 3/2015 |
| JP | 2011-134252 | 7/2011 |
| JP | 5191376 | 5/2013 |
| KR | 10-2004-0034063 | 4/2004 |
| TW | I256569 | 6/2006 |
| WO | WO 94/006103 | 3/1994 |
| WO | WO 96/041488 | 12/1996 |
| WO | WO 00/055778 | 9/2000 |
| WO | WO 00/055789 | 9/2000 |
| WO | WO 00/055790 | 9/2000 |
| WO | WO 01/011522 | 2/2001 |
| WO | WO 01/084281 | 11/2001 |
| WO | WO 02/027610 | 4/2002 |
| WO | WO 02/097563 | 12/2002 |
| WO | WO 03/071388 | 8/2003 |
| WO | WO 02/037219 A9 | 5/2004 |
| WO | WO 2004/046882 | 6/2004 |
| WO | WO 2006/069199 | 6/2006 |
| WO | WO 2007/001394 | 1/2007 |
| WO | WO 2008/054403 | 5/2008 |
| WO | WO 2008/054849 | 5/2008 |
| WO | WO 2008/147918 | 12/2008 |
| WO | WO 2009/062111 | 5/2009 |
| WO | WO 2009/117518 | 9/2009 |
| WO | WO 2010/132492 | 11/2010 |
| WO | WO 2011/044036 | 4/2011 |
| WO | WO 2012/054646 | 4/2012 |
| WO | WO 2012/112781 | 8/2012 |
| WO | WO 2013/026343 | 2/2013 |
| WO | WO 2013/126281 | 8/2013 |
| WO | WO 2014/008079 | 1/2014 |
| WO | WO 2014/008247 | 1/2014 |
| WO | WO 2014/150987 | 9/2014 |
| WO | WO 2018/175440 | 9/2018 |
| WO | WO 2018/208770 | 11/2018 |
| WO | WO 2019/006272 | 1/2019 |
| WO | WO 2019/050864 | 3/2019 |

OTHER PUBLICATIONS

Exploring User Behavior and Cybersecurity Knowledge—An experimental study in Online Shopping; 2018 16th Annual Conference on Privacy, Security and Trust (PST) (pp. 1-10); Ghada El Haddad, Amin Shahab, Esma Aimeur; Aug. 28, 2018. (Year: 2018).*
U.S. Appl. No. 09/557,252, filed Apr. 24, 2000, Page.
U.S. Appl. No. 12/705,489, filed Feb. 12, 2010, Bargoli et al.
U.S. Appl. No. 12/705,511, filed Feb. 12, 2010, Bargoli et al.
"A New Approach to Fraud Solutions", BasePoint Science Solving Fraud, pp. 8, 2006.
Aad et al., "NRC Data Collection and the Privacy by Design Principles", IEEE, Nov. 2010, pp. 5.
"Arizona Company Has Found Key in Stopping ID Theft," PR Newswire, New York, Aug. 10, 2005 http://proquest.umi.com/pqdweb?did=880104711&sid=1&Fmt=3&clientId=19649&RQT=309&Vname=PQD.
ABC News Now:Money Matters, as broadcasted Nov. 15, 2005 with guest Todd Davis (CEO of Lifelock), pp. 6.
AlSalamah et al., "Security Risk Management in Online System", 2017 5th International Conference on Applied Computing and Information Technology/4th International Conference on Computational Science/Intelligence and Applied Informatics/2nd International Conference on Big Data, Cloud Computing, Data Science & Engineering, 2017, pp. 119-124.
Anonymous, "Feedback", Credit Management, ABI/INFORM Global, Sep. 2006, pp. 6.
"Beverly Hills Man Convicted of Operating 'Bust-Out' Schemes that Caused More than $8 Million in Losses", Department of Justice, Jul. 25, 2006, 2 Pgs.
Bielski, Lauren, "Will you Spend to Thwart ID Theft?" ABA Banking Journal, Apr. 2005, pp. 54, 56-57, 60.
BlueCava, "What We Do", http://www.bluecava.com/what-we-do/, printed Nov. 5, 2012 in 3 pages.

(56) References Cited

OTHER PUBLICATIONS

"Bust-Out Schemes", Visual Analytics Inc. Technical Product Support, Newsletter vol. 4, Issue 1, Jan. 2005, pp. 7.
Chores & Allowances, "Do Kids Have Credit Reports?" Oct. 15, 2007, http://choresandallowances.blogspot.com/2007/10/do-kids-have-credit-reports.html, pp. 5.
CreditSesame; "FAQ's"; http://www.creditsesame.com/how-we-help/faqs/#cb printed Dec. 5, 2011 in 8 pages.
CreditSesame; "Promote Your Financial Responsibility to Get an Edge in Life"; http://www.creditsesame.com/credit-badge/ printed Dec. 2, 2011 in 1 page.
Cowie, Norman, "Warning Bells & 'The Bust-Out'", Business Credit, Jul. 1, 2000, pp. 5.
Cullen, Terri; "The Wall Street Journal Complete Identity Theft Guidebook:How to Protect Yourself from the Most Pervasive Crime in America"; Chapter 3, pp. 59-79; Jul. 10, 2007.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning:Tech Talk; pp. 36-38; Sep. 2004.
EFunds Corporation, "Data & Decisioning: Debit Report" printed Apr. 1, 2007, http://www.efunds.com/web/industry-solutions/financial-services/frm-debit-report/htm in 1 page.
Elmasri et al., "Fundamentals of Database Systems, Third Edition (Excerpts)", Jun. 2000, pp. 253, 261, 268-270, 278-280, 585, 595.
Equifax; "Equifax Credit Watch"; https://www.econsumer.equifax.co.uk/consumer/uk/sitepage.ehtml, dated Jun. 27, 2007 on www.archive.org.
Ettorre, "Paul Kahn on Exceptional Marketing," Management Review, vol. 83, No. 11, Nov. 1994, pp. 48-51.
Experian Team, "Impact on Credit Scores of Inquiries for an Auto Loan," Ask Experian, Mar. 1, 2009, pp. 5.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
Familysecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
"Fighting the New Face of Fraud", FinanceTech, http://www.financetech.com/showArticle.jhtml?articleID=167100405, Aug. 2, 2005.
"FinExtra, Basepoint Analytics Introduces Predictive Technology for Mortgage Fraud", Oct. 5, 2005, pp. 3.
Fisher, Joseph, "Access to Fair Credit Reports: Current Practices and Proposed Legislation," American Business Law Journal, Fall 1981, vol. 19, No. 3, p. 319.
"Fraud Alert | Learn How". Fight Identity Theft. http://www.fightidentitytheft.com/flag.html, accessed on Nov. 5, 2009.
Garcia-Molina et al., "Database Systems: The Complete Book", Prentice Hall, Inc., Ch. 15, Oct. 1, 2001, pp. 713-715.
Gibbs, Adrienne; "Protecting Your Children from Identity Theft," Nov. 25, 2008, http://www.creditcards.com/credit-card-news/identity-ID-theft-and-kids-children-1282.php, pp. 4.
"GLBA Compliance and FFIEC Compliance" http://www.trustwave.com/financial-services.php printed Apr. 8, 2013 in 1 page.
Gordon et al., "Identity Fraud: A Critical National and Global Threat," LexisNexis, Oct. 28, 2003, pp. 1-48.
Haglund, Christoffer, "Two-Factor Authentication with a Mobile Phone", Fox Technologies, Uppsala, Department of Information Technology, Nov. 2, 2007, pp. 62.
Herzberg, Amir, "Payments and Banking with Mobile Personal Devices," Communications of the ACM, May 2003, vol. 46, No. 5, pp. 53-58.

"ID Analytics ID Network", from www.idanalytics.com, as retrieved from www.archive.org, dated Nov. 20, 2005 or earlier; attached as "ID Network (IDN)", pp. 8.
ID Cops, www.idcops.com; retrieved from www.archive.org any linkage Feb. 16, 2007.
ID Theft Assist, "Do You Know Where Your Child's Credit Is?", Nov. 26, 2007, http://www.idtheftassist.com/pages/story14, pp. 3.
"ID Thieves These Days Want Your Number Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&sid=1&Fmt=3&clientid=19649&RQT=309&Vname=PQD.
Ideon, Credit-Card Registry that Bellyflopped this Year, Is Drawing some Bottom-Fishers, The Wall Street Journal, Aug. 21, 1995, pp. C2.
"Industry News, New Technology Identifies Mortgage Fraud: Basepoint Analytics Launches FraudMark", Inman News, American Land Title Association, Oct. 5, 2005, pp. 1.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
"Intelligent Miner Applications Guide", IBM Corp., Apr. 2, 1999, Chapters 4-7, pp. 33-132.
"Intersections, Inc. Identity Guard", from www.intersections.com and www.identityguard.com, as retrieved from Internet Archive, dated Nov. 25, 2005 or earlier; attached as "Identity Guard (IDG)", pp. 7.
Iovation, Device Identification & Device Fingerprinting, http://www.iovation.com/risk-management/device-identification printed Nov. 5, 2012 in 6 pages.
Jacob et al., A Case Study of Checking Account Inquiries and Closures in Chicago, The Center for Financial Services Innovation, Nov. 2006.
Jin et al., "Network Security Risks in Online Banking", 2005 International Conference on Wireless Communications, Networking and Mobile Computing, Jan. 2005, vol. 2, pp. 1229-1234.
Karlan et al., "Observing Unobservables:ldentifying Information Asymmetries with a Consumer Credit Field Experiment", Jun. 17, 2006, pp. 58, http://aida.econ.yale.edu/karlan/papers/ObservingUnobservables.KarlanZinman.pdf.
Khan, Muhammad Khurram, PhD., "An Efficient and Secure Remote Mutual Authentication Scheme with Smart Cards" IEEE International Symposium on Biometrics & Security Technologies (ISBAST), Apr. 23-24, 2008, pp. 1-6.
Lamons, Bob, "Be Smart: Offer Inquiry Qualification Services," Marketing News, ABI/Inform Global, Nov. 6, 1995, vol. 29, No. 23, pp. 13.
Lee, Timothy B., "How America's Broken Tax System Makes Identity Theft Easy", http://www.vox.com/2014/4/14/5608072/how-americas-broken-tax-system-makes-identity-theft-easy, Apr. 14, 2014, pp. 10.
Lee, W.A.; "Experian, on Deal Hunt, Nets Identity Theft Insurer", American Banker: The Financial Services Daily, Jun. 4, 2003, New York, NY, 1 page.
Lefebvre et al., "A Robust Soft Hash Algorithm for Digital Image Signature", International Conference on Image Processing 2:11 (ICIP), vol. 3, Oct. 2003, pp. 495-498.
Lifelock, "How LifeLock Works," http://www.lifelock.com/lifelock-for-people printed Mar. 14, 2008 in 1 page.

(56) References Cited

OTHER PUBLICATIONS

Lifelock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
Lifelock, "Personal Identity Theft Protection & Identity Theft Products," http://www.lifelock.com/lifelock-for-people, accessed Nov. 5, 2007.
Lifelock, Various Pages, www.lifelock.com/, Jan. 9, 2007, pp. 49.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
Ogg, Erica, "Apple Cracks Down on UDID Use", http://gigaom.com/apple/apple-cracks-down-on-udid-use/ printed Nov. 5, 2012 in 5 Pages.
Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
"PremierGuide Announces Release 3.0 of Local Search Platform", Business Wire, Mar. 4, 2004, Palo Alto, CA, p. 5574.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
Privacy Rights Clearinghouse, "Identity Theft: What to do if it Happens to You," http://web.archive.org/web/19990218180542/http://privacyrights.org/fs/fs 17a.htm printed Feb. 18, 1999.
Quinn, Tom, "Low Credit Inquiries Affect Your Credit Score", Credit.com, May 2, 2011, pp. 2.
Rivera, Barbara, "New Tools for Combating Income Tax Refund Fraud", https://gcn.com/Articles/2014/05/08/lnsight-tax-fraud-tools.aspx?Page=1, May 8, 2014, pp. 3.
Scholastic Inc.:Parent's Request for Information http://web.archive.org/web/20070210091055/http://www.scholastic.com/inforequest/index.htm as archived Feb. 10, 2007 in 1 page.
Scholastic Inc.Privacy Policy http://web.archive.org/web/20070127214753/http://www.scholastic.com/privacy.htm as archived Jan. 27, 2007 in 3 pages.
Shoeboxed, https://www.shoeboxed.com/sbx-home/ printed Oct. 16, 2012 in 4 pages.
Singletary, Michelle, "The Littlest Victims of ID Theft", The Washington Post, The Color of Money, Oct. 4, 2007.
Sumner, Anthony, "Tackling the Issue of Bust-Out Fraud", Retail Banker International, Jul. 24, 2007, pp. 4.
Sumner, Anthony, "Tackling the Issue of Bust-Out Fraud", Experian: Decision Analytics, Dec. 18, 2007, pp. 24.
Sumner, Anthony, "Tackling the Issue of Bust-Out Fraud", e-News, Experian: Decision Analytics, pp. 4, [Originally Published in Retail Banker International Magazine Jul. 24, 2007].
"The Return Review: Program Increases Fraud Detection; However, Full Retirement of the Electronic Fraud Detection System Will be Delayed", Treasury Inspector General for Tax Administration, Sep. 25, 2017, Reference No. 2017-20-080, pp. 27.
Themorningcall.Com, "Cheap Ways to Foil Identity Theft," www.mcall.com/business/columnists/all-karp.5920748jul01,0 . . . , published Jul. 1, 2007.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
Vamosi, Robert, "Howto Handle ID Fraud's Youngest Victims," Nov. 21, 2008, http://news.cnet.com/8301-10789_3-10105303-57.html.
Various Posts from the http://www.2p.wrox.com Forums: http://web.archive.org/web/20050452221950/http://p2p.wrox.com/topic.asp?TOPIC_ID=6513, dated Nov. 15, 2003-Oct. 7, 2004.
Web Page posted at: http://web.archive.org/web20040805124909/http://www.oracle.com/technology/sample_codete/tech/pl_sql/htdocs/x/Case/start.htm, pp. 1 and 4 of the webpages posted on Jan. 7, 2003.
Webpage printed out from http://www.jpmorgan.com/cm/ContentServer?c=TS_Content&pagename=jpmorgan%2Fts%2FTS_Content%2FGeneral&cid=1139403950394 on Mar. 20, 2008, Feb. 13, 2006, New York, NY.
Wilson, Andrea, "Escaping the Alcatraz of Collections and Charge-Offs", http://www.transactionworld.net/articles/2003/october/riskMgmt1.asp, Oct. 2003.
International Search Report and Written Opinion for Application No. PCT/US2007/06070, dated Nov. 10, 2008.
International Search Report and Written Opinion for Application No. PCT/US2008/064594, dated Oct. 30, 2008.
International Preliminary Report and Written Opinion in PCT/US2008/064594, dated Dec. 10, 2009.
International Search Report and Written Opinion for Application No. PCT/US09/60393, dated Dec. 23, 2009.
International Search Report and Written Opinion for Application No. PCT/US09/37565, dated May 12, 2009.
International Search Report and Written Opinion for Application No. PCT/US2010/034434, dated Jun. 23, 2010.
International Preliminary Report on Patentability for Application No. PCT/US2010/034434, dated Feb. 4, 2014.
Official Communication in Australian Patent Application No. 2012217565, dated May 12, 2017.
Official Communication in Australian Patent Application No. 2017203586, dated Jun. 18, 2019.
Official Communication in Australian Patent Application No. 2019279982, dated Dec. 19, 2019.
Official Communication in Canadian Patent Application No. 2,827,478, dated Jun. 29, 2017.
Official Communication in Canadian Patent Application No. 2,827,478, dated May 31, 2018.
Official Communication in Canadian Patent Application No. 2,827,478, dated Mar. 27, 2019.
Extended European Search Report for Application No. EP12747205, dated Sep. 25, 2014.
Supplementary European Search Report for Application No. EP12747205, dated Jun. 19, 2015.

(56) References Cited

OTHER PUBLICATIONS

Extended European Search Report for Application No. EP18748000, dated Dec. 13, 2018.

International Search Report and Written Opinion for Application No. PCT/US2012/025456, dated May 21, 2012.

International Preliminary Report on Patentability in Application No. PCT/US2012/025456, dated Aug. 21, 2013.

International Search Report and Written Opinion for Application No. PCT/US2011/033940, dated Aug. 22, 2011.

Allard et al., "Safe Realization of the Generalization Privacy Mechanism", 2011 Ninth Annual International Conference on Privacy, Security and Trust, pp. 8.

"Dealing with Measurement Noise (A Gentle Introduction to Noise Filtering)", Chemical and Process Engineering, University of Newcastle Upon Tyne, https://web.archive.org/web/20000418021742/http://lorien.ncl.ac.uk/ming/filter/filewma.htm, Archived Apr. 18, 2000, pp. 3.

El Kalam et al., "Personal Data Anonymization for Security and Privacy in Collaborative Environments", 2005 IEEE, pp. 56-61.

Ribeiro et al., "Privacy Protection with Pseudonumization and Anonumization in a Health IoT System", Results from OCARIoT, 2019 IEEE, pp. 904-908.

U.S. Appl. No. 13/665,636, Pre-Data Breach Monitoring, filed Oct. 31, 2012.

U.S. Appl. No. 16/657,057, U.S. Pat. No. 11,030,562, Pre-Data Breach Monitoring, Oct. 18, 2019.

\* cited by examiner www.databreachservice.com/

Select Data Sources to Scan:

- ● Public Internet
- ● Dark Web
- ● Social Media
- ● Sex Offender Database
- ○ HealthCare
- ○ Fraudulent Activity
- ● Fraud Risk Select Scan Frequency: Daily / Weekly / Monthly / Other

SUBMIT

FIGURE 4A

:::Experian:

Public Internet:
30 consumer email addresses were found online

Dark Web:
10 consumer SSN#s were found online

Social Media:
25 consumer phone numbers are listed on social media sites

Sex Offender Database:
3 employees were found in the database

Health Care:
NOT SCANNED

Fraudulent Activity:
NOT SCANNED

Fraud Risk
22 consumers scored higher than 600 points

PRE-DATA BREACH MONITORING

CROSS-REFERENCE TO RELATED APPLICATIONS

This application is a continuation of U.S. application Ser. No. 16/657,057, filed Oct. 18, 2019, which is a continuation of U.S. application Ser. No. 13/665,636, filed Oct. 31, 2012, which claims the benefit of U.S. Provisional Application No. 61/553,761, filed on Oct. 31, 2011, the disclosures of which are hereby incorporated by reference in their entirety.

BACKGROUND

With consumers providing personal information more frequently to online websites and services, data breaches of that personal data held by companies are becoming more frequent. In general, a data breach occurs when personal information of customers is compromised. For example, a fraudster may hack into a customer database in order to access personal information of the customers, such as name, address, contact information, credit card or other billing information, secret questions and answers, social security number, etc.

SUMMARY

In the event of a data breach, the breached company can perform remediation processes, but it would be advantageous for the company to prevent the breach from occurring, or at least identify the breach as soon as possible so such remediation processes can be performed before extensive damage to the identity of the company's customers has occurred.

Disclosed herein are systems and methods for pre-breach data monitoring that may be used to detect possible breaches of personal information, such as information of customers and/or employees of a company. For example, a pre-breach monitoring system may provide information to a requesting entity (e.g., a business) that is useful to predict portions of the company data (e.g., employee and/or customer information) that may not be secured well enough and other risks associated with data breaches, such as employees that may not be trustworthy.

Described herein, among other things, are systems and methods for enabling a requesting entity to request that a pre-breach system monitors one or more data sources in order to identify information associated with consumers affiliated with the requesting entity (e.g., customers and/or employees), and to then generate one or more data breach risk score that are usable to predict portions of the requesting entity's data that may not be secured well enough. In one embodiment, the requesting entity provides the pre-breach system with a file including identification information of a plurality of consumers (e.g., employees and/or customers of the requesting entity) and requests a comparative scan from a plurality of data sources. One or more breach risk scores may be generated based on the results from the comparative scan. The risk scores may then be provided to the requesting entity.

In one embodiment, a method of monitoring online data to predict or determine a risk of data breach associated with customers and/or employees of a requesting entity comprises receiving a scan list comprising information regarding a plurality of individuals associated with a requesting entity, periodically scanning a plurality of data sources for information regarding the individual on the scan list, identifying, for each of a plurality of data breach risk categories, a quantity of located data regarding the individuals, for each of the plurality of data breach risk categories, determining a difference between the quantity of located data and a quantity of located data identified in one or more previous scans of the plurality of data sources, and based on at least the determined differences for respective data breach risk categories, providing the requesting entity with an assessment of potential or actual data breach, wherein the assessment is usable to determine a likelihood of whether the requesting entity's data has been breached.

In one embodiment, the assessment of potential or actual data breaches includes a risk score for each of the data breach risk categories based on at least the determined difference for respective data breach risk categories. An overall risk score may be based on risk scores for each of the data breach risk categories. The overall risk score may be an average of the risk scores for each of the data breach risk categories. A first of the risk scores may be weighted more heavily in determining the overall risk score than a second of the risk scores.

In one embodiment, the plurality of data breach risk categories includes one or more of public internet, dark web, social media, sex offender, healthcare, or fraud risk. Public internet data sources may include any sites that are available via a typical browser, such as sites that are locatable by typing in a URL or locatable by an internet search engine (e.g., Google). Dark web data sources may include sites or other information on network hosts that are not widely accessible on the Internet, and may also be referred to as dark address space. Such dark web sites may have domains (e.g., .onion) that are only accessible with particular software or browsers (e.g., Tor). Because of the way some of these dark web browsers and hosts are configures, both the host serving out web pages and the requesting client may be obscured and not easily identifiable. Social media data sources may include any number of sites wherein users can share information, comments, interests, photographs, etc., either on a personal or professions level. Examples of currently available social media sites include Facebook, Twitter, LinkedIn, Pinterest, and countless others. Sex offender data sources may include government operated databases and/or private database that may include information from one or more governments and/or information obtained from other sources. Healthcare data sources include any data regarding health information of individuals, including HIPAA (Health Insurance Portability and Accountability Act) and non-HIPAA information. Healthcare data sources may include insurance sites, patient health records sites, health care provider sites, government healthcare sites, and/or any other data sources that may include information regarding health of individuals. In some embodiments, certain data sources may be associated with multiple risk categories. For example, a social media site may also include healthcare information and, thus, may be associated with both a social media and a healthcare category. Fraud risk data sources may include sites and/or services that provide information regarding risk of fraud associated with an individual. For example, a third party service may lookup information associated with an individual and provide back a fraud risk score (or simply "fraud score") that indicates a likelihood that the person really is who they say they are and/or a risk of fraud being perpetrated by the individual.

In one embodiment, the periodic scanning is performed on a frequency determined by the requesting entity. The generated scores may indicate respective percentage changes between the quantity of located data and a quantity of located data identified in one or more previous scans of the plurality of data sources. The method may further comprises providing indications of one or more measures taken to improve the risks identified. The measures taken to improve the risks identified by one requesting entity may be compared with the measures taken by other businesses or requesting entities. The measures taken to improve the risks identified may be monitored periodically and correspond to a badge associated with the requesting entity.

In one embodiment, in response to determining that the assessment of potential or actual data breach is acceptable, the requesting entity is provided the ability to place a badge on information provided by the requesting entity, the badge indicating that the requesting entity has taken measures to reduce risks of data breach. The badge may be selected from a plurality of badges, wherein respective badges indicate various levels of measures taken to reduce risks of data breach and/or a current level of risk of data breach.

BRIEF DESCRIPTION OF THE DRAWINGS

FIG. 4A illustrates an example user interface that allows a requesting entity to select data categories to include in a pre-breach scan, as well as a frequency of performing the scan.

FIG. 4B illustrates an example user interface that provides the requesting entity with a summary of data breach scores for particular data breach categories.

DETAILED DESCRIPTION

Figure 1:
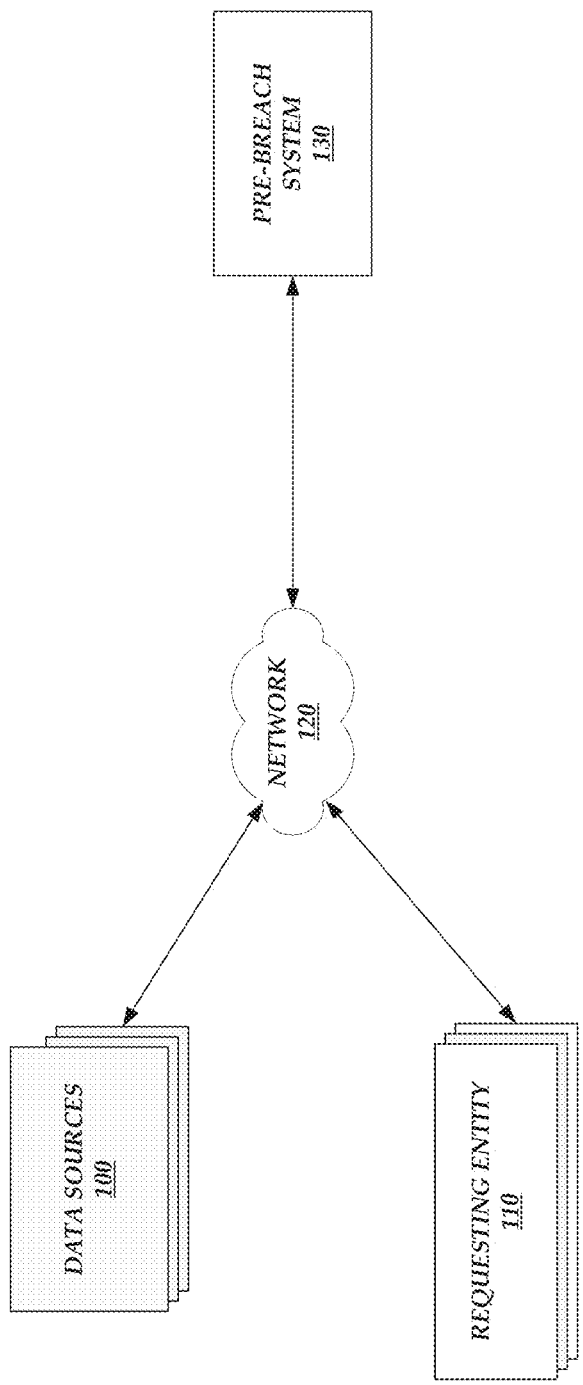
FIG. 1 is a block diagram illustrating one embodiment of a pre-data breach monitoring device in communication with data sources and a requesting entity.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

The embodiments disclosed herein describe systems and methods for pre-data breach monitoring. A requesting entity, such as a business, may request generation of a one or more breach risk scores through a pre-data breach monitoring system (also referred to as "pre-breach system") to predict portions of the requesting entity's data that may not be secured well enough and other risks associated with data breaches. One or more breach risk scores may be generated by comparing data provided by the requesting entity including identification information of a plurality of individual associated with the requesting entity, such as its customers or employees. The breach risk scores may be based on information from one or more data sources, which may be placed into risk categories. For example, data breach risk categories (or simply "risk categories) may include public internet, the Dark Web, social media sites, sex offender databases, heath care, fraudulent activity sites, or fraud risk score. Each of the risk categories may be associated with one or more data sources, such as website, databases, servers, or other data sources. Thus, information for a particular risk category may be retrieved from a plurality of data sources.

In one embodiment, a requesting entity, such as a business, may request generation of one or more data breach risk scores associated with respective risk categories. In one embodiment, such data breach risk scores may be calculated periodically, e.g. monthly, in order to periodically update risks associated with each of the data breach categories.

In one embodiment, changes in risk scores over a period of time may result in the requesting entity being rewarded a badge that reflects the positive improvement. For example, if a requesting entity has an overall risk score (e.g., based on multiple risk scores for respective risk categories) that has decreased by a certain percentage from a previous overall risk score (e.g., from a previous month), the requesting entity may be provided an opportunity to place a badge on the company's website, for example, to serve as an indication that the company is proactive in monitoring how its customers and/or employees data is used. Depending on the embodiment, different levels of badges may be provided to a requesting entity that are indicative of different measures taken by the requesting entity in monitoring for, remediating, and/or preventing breach of company data. In some embodiments, badges may be revoked or downgraded if the requesting entity fails to maintain a suitable level of risk (e.g., one or more risk scores must be maintained above threshold levels) in one or more data breach risk categories.

Example System Implementation

Figure 11:
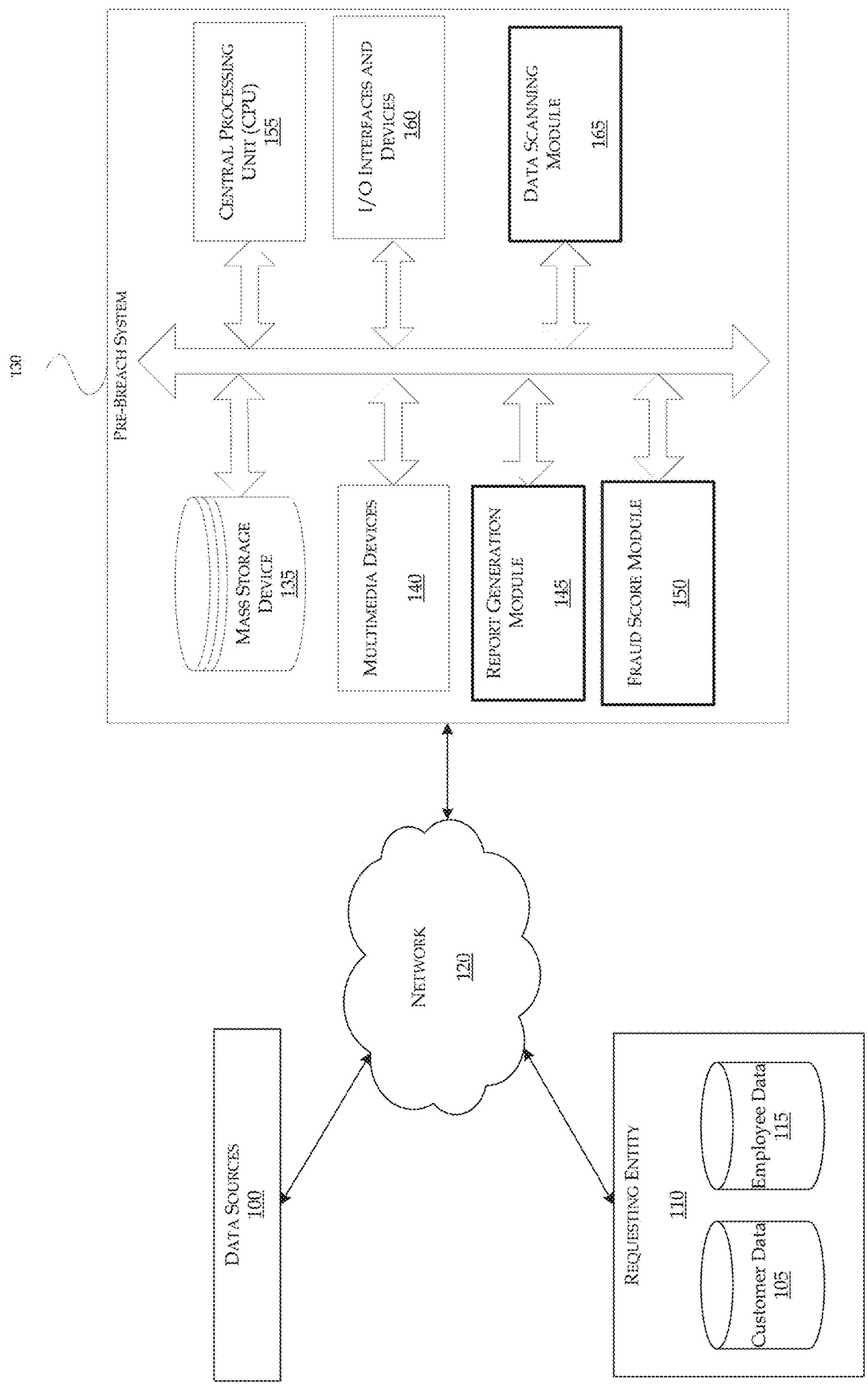
FIG. 11 is a block diagram depicting one embodiment of the pre-data breach monitoring system in communication with a network and various systems which are also in communication with the network.

FIG. 1 is a block diagram showing an example configuration of a pre-data breach monitoring system 130 (or "pre-breach system 130") in communication with a requesting entity 110 and data sources 100. In this embodiment, a requesting entity 110 communicates with the pre-breach system 130 with a request for the pre-breach system 130 to predict portions of the requesting entity's data that may not be secured well enough and/or other risks associated with data breaches. In this embodiment, the requesting entity 110 represents any entity that collects identification information on its customers, employees, or any consumers. Thus the requesting entity 110 may be a business, non-profit organization, government organization, other group, or even an individual consumer. FIG. 11, discussed below, further illustrates example components and operations of the pre-breach system 130.

In one embodiment, the requesting entity 110 requests data breach risk scoring from the pre-breach system 130. In one embodiment, the requesting entity 110 provides the pre-breach system 130 with a scan list comprising one or more data structures including identification information of a plurality of its consumers (or employees) so that the pre-breach system 130 can identify potential misuses of those consumers' information. The pre-breach system 130 may perform (or initiate performance by one or more other computing systems) a scan of one or more data sources 100 for identification information on these respective consumers. The consumer information may include, for example, one or more of: Last Name, First Name, Middle Name, Generation Code, Social Security Number, Date of Birth, Phone Number, Drivers' License, State, Drivers' License Number, Street Address, City Name, State, Zip Code, account number or other custom data associated with an account of the consumer with the requesting entity, Credit card number, credit data, Email, and/or any other data. In one embodiment, the pre-breach system 130 may access and/or download information from multiple data sources and then compare the consumer information from the requesting entity with the accessed information in order to identify any matches. Once such comparisons are performed, the pre-breach system 130 may generate one or more data breach risk scores indicative of data breach risks in respective risk categories. The results may then be provided to the requesting entity 110 in various manners.

In one embodiment, the data sources 100 represent any online, offline, and/or other data sources and/or an entity that scans the various online, offline, and/or other data sources. Depending on the embodiment, data from any number of data sources 100 may be accessed by the pre-breach system 100, whether the pre-breach system 130 scans the data sources itself or receives the information (or summaries of the information) from certain data sources from a third-party entity that perform such scans. For example, a first data source may comprise the public internet, while a second data source may comprise the Dark Web. Other data sources may include data from social networks, sex offender databases, health care databases, fraud risk scoring systems, or any other type of data source that may contain consumer information.

In one embodiment, the data breach risk scores generated by the pre-breach system 130 are based on comparisons of data regarding individuals on the requesting entity's scan list with data regarding the same individuals from one or more previous scans. For example, the pre-breach system 130 may compare a quantity of matches of personal information for a particular requesting entity from a particular data source to the corresponding quantity of matches located in a previous scan in order to determine a risk score for a particular risk category. For example, if a scan list of 1,000 customers results in 50 matches of customer information located on social media sites, but in a previous scan only 40 matches of customer information were identified on social media sites, a risk score for the social media risk category may be calculated based on a comparison of the 40 matches to the 50 matches. For example, a percentage increase/decrease may be included in a data breach risk score.

In one embodiment, the assessment of potential or actual data breaches is performed at least partially manually. In other embodiments, the assessment of potential or actual data breaches is performed at least partially automatically by a computing device.

In one embodiment, the requesting entity 110 can request periodic scanning of customized data breach categories. For example, a requesting entity 110 may choose to have the pre-breach system 130 monitor and scan the public internet and the Dark Web for its consumers' information every month. Based on this periodic scanning, the requesting entity 110 can determine an increase or decrease in actual or potential data breach risks over a period (such as risk associated with respective risk categories, as well as an overall risk score that may be based on multiple category risk scores). Similarly, another requesting entity may request that the pre-breach system 130 scans additional data sources, possibly on a different frequency. Additionally, a requesting entity may establish rules for frequency of scanning different data sources such that data sources associated with a first risk category are scanned at a first frequency (e.g., weekly), while one or more data sources associated with a second risk category are scanned at a second frequency (e.g., quarterly).

In one embodiment, the data breach risk scores generated by the pre-breach system 130 over a period can be assessed and a percentage change may be calculated based on the increase or decrease in respective data breach risk scores. These percentage changes may correspond with a badge that may be awarded to a requesting entity 110 that has met certain requirements in addressing its data breach risks. Depending on the embodiment, this badge may be removed if the requesting entity fails to take continued action to address data breach risks identified.

Example Methods

Figure 2:
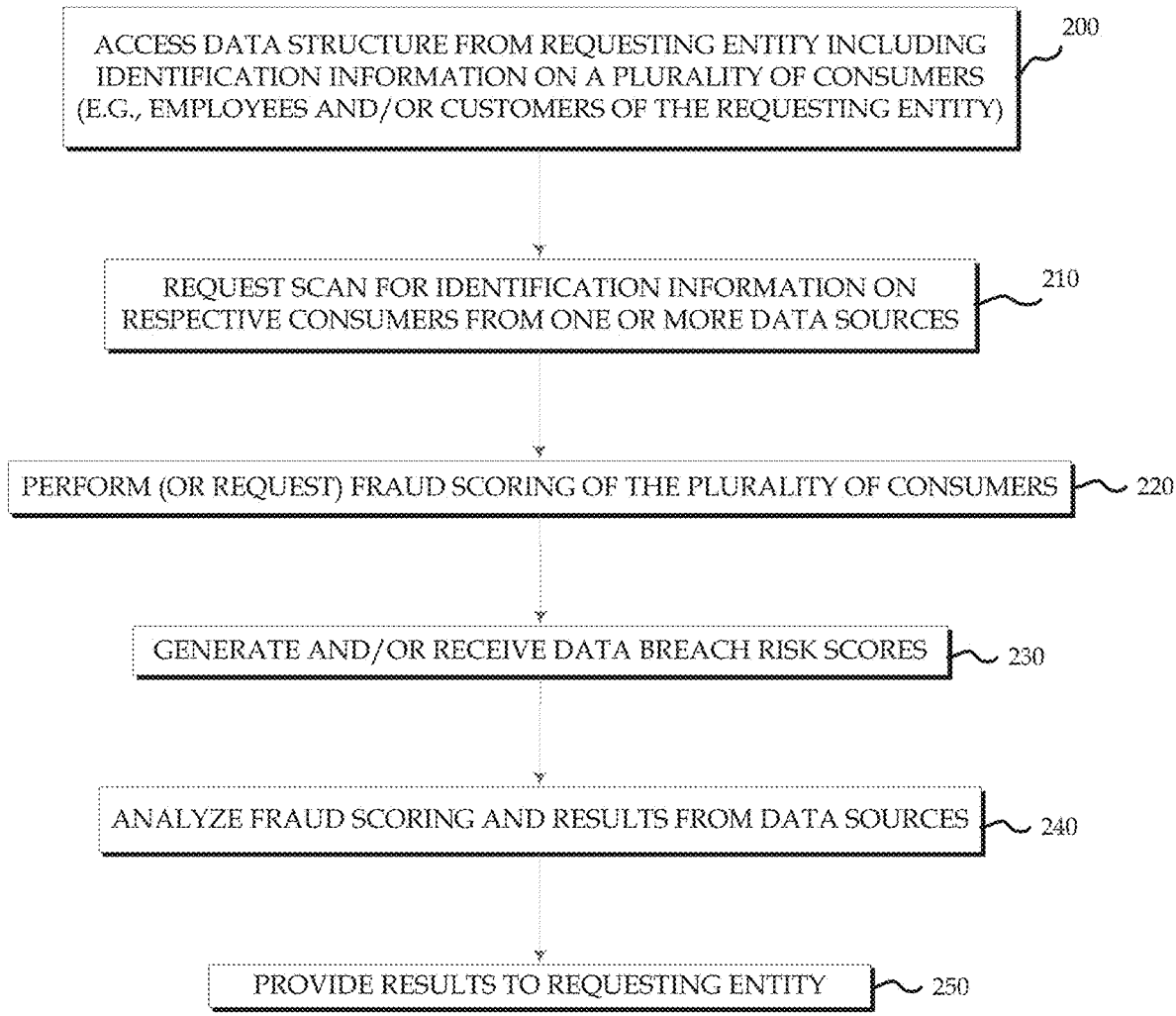
FIG. 2 is a flowchart illustrating one embodiment of a method for performing fraud scoring and providing the results to a requesting entity.

FIG. 2 is a flowchart illustrating one embodiment of a method of providing data breach risk assessments. In an embodiment, the method shown in FIG. 2 may be performed substantially in real time so that the requesting entity 110 is presented with data breach risk scores and/or detailed reports containing information related to actual or potential data breaches without substantial delay. Alternatively, the method of FIG. 2 may be performed as part of a scheduled batch process, such as a pre-breach scanning process that may be performed on a requesting entities customer and/or employees on a periodic basis. Depending on the embodiment, the method may be performed with fewer or additional blocks than are illustrated in FIG. 2. In one embodiment, the method of FIG. 2 is performed by the pre-breach system 130. However, the method may be performed by one or more other suitable computing systems, such as a computing system that includes data scanning and data breach risk scoring modules that perform similar features to those discussed with reference to the pre-breach system 130. For ease of discussion, the methods discussed below will be described with reference to the pre-breach system 130. However, the methods may be performed by any other suitable computing system.

At block 200, the pre-breach system 130 accesses a scan list from the requesting entity 110 that includes one or more data structures having identification information on a plurality of consumers (e.g., employees and/or customers of the requesting entity). Such information may include, for example, one or more of: Last Name, First Name, Middle Name, Generation Code, Social Security Number, Date of Birth, Phone Number, Drivers' License, State, Drivers' License Number, Street Address, City Name, State, Zip Code, account number or other custom data associated with an account of the consumer with the requesting entity, Credit card number, credit data, Email, and/or any other data. In some embodiments, the information can be accessed through one or more user interfaces provided to the requesting entity 110. Alternatively, the information may be accessed in other manners, such as via a batch process wherein a data structure including information regarding a plurality of consumers is transmitted by the requesting entity to the pre-breach system 130, such as daily, weekly, or monthly. The information may be included in any available file format, such as a database, spreadsheet, or markup language format.

At block 210, the pre-breach system 130 requests a scan for identification information on respective consumers and/or employees from one or more data sources 100. Depending on the embodiment, data may be requested by the pre-breach system 130 from any number of public or private data sources 100. For example, data sources 100 may be in various risk categories, such as public internet, the Dark Web, social networks, sex offender databases, health care databases, fraud risk scoring systems, or any other type of data that may include consumer information.

In some embodiments the pre-breach system 130 requests data from other entities, such as social networking and sex offender database scanning entities, in addition to (or replacement to) scanning of certain data sources, e.g., the public internet, that may be performed by the pre-breach system 130. In one embodiment, the pre-breach system 130 scans one or more data sources 100 for information regarding individuals on the scan list from the requesting entity 110 in order to identify indications of potential data breaches of the requesting entity's data 110.

At block 220, the pre-breach system 130 performs or requests fraud risk scoring of the plurality of consumers. The fraud risk score may be generated based on customer or employee information provided by the requesting entity 110. For example, the customer information may be provided to a fraud score provider and, in return, the pre-breach system 130 may receive fraud scores for respective individuals. In one embodiment, fraud risk scores (or simply "fraud scores") may be provided by Experian's Precise ID and/or other fraud risk analysis systems.

At block 230, the pre-breach system 130 generates and/or receives data breach risk score, such as for respective data breach risk categories. Depending on the embodiment, fewer and/or additional data breach categories than note above may be used.

Depending on the embodiment, the data breach risk scores may be based on a quantity of information located in the scan associated with individuals on the scan list and/or on one or more analytical models that analyze the information associated with the individuals that was located. For example, the type of information located at a particular data sources may affect how heavily weighted the information is in determined one or more risk scores for respective risk categories. For example, if only a last name and first name of multiple consumers are located within data source associated with a public internet risk category, such information may have little or no effect on a the risk score for that category. However, if more sensitive information of consumers is identified, such as Social Security number, driver's license number, etc., such information may have a larger effect on a breach risk score for the risk category. In some embodiments, scanning of the data from one or more data sources includes looking for information that is unique (or substantially unique) to the requesting entity. Location of such unique information, such as account numbers, may be a strong indicator that the consumer information located with that unique information was leaked from the particular requesting entity. Thus, location of information that is unique to a particular requesting entity may result in a large effect (or weighting) on a data breach risk score for the risk category from which the unique information was located. With reference to fraud risk scores, a risk score for the fraud risk category may be based on changes in risk scores of the individuals on the scan list from one or more previous scans.

At block 240, the pre-breach system 130 analyzes the data breach risk scores, any generated data breach risk scores, and/or other data obtained or determined in view of scanning the data sources. In one embodiment, the pre-breach system 130 may provide the requesting entity with an indication of whether there is a potential or actual breach in the requesting entity's consumer information. For example, an overall data breach risk score may be calculated based on one or more calculated category risk scores and/or fraud risk scores for the consumers. Thus, in one embodiment an overall data breach risk score may be provided to the requesting entity as an indicator of a likelihood that information of the entities customers and/or employees has been compromised. In some embodiments, the pre-breach system 130 may provide an indication of likelihood that any located information regarding individuals on the scan list was leaked from the requesting entity or from another entity. Such a likelihood may be determined based on matching of information unique to the requesting entity and/or a quantity of individuals on the scan list for which information is located on a particular data source, possibly in a same area of the data source or even in a same order as on the scan list. In other embodiments, additional information may be provided to the requesting entity, such as the individual risk scores for various risk categories and/or indications of changes in risk scores over time.

At block 250, the pre-breach system 130 provides results from the analysis of to the requesting entity 110. In one embodiment, the pre-breach system 130 generates one or more reports for access by the requesting entity 110 detailing the consumer information that was assessed. In another embodiment, the requesting entity 110 may choose which risk categories to view on its detailed report. In some embodiments, the pre-breach system 130 provides the requesting entity 110 with charts comparing the selected data breach risk scores between two or more scanning periods.

Figure 3:
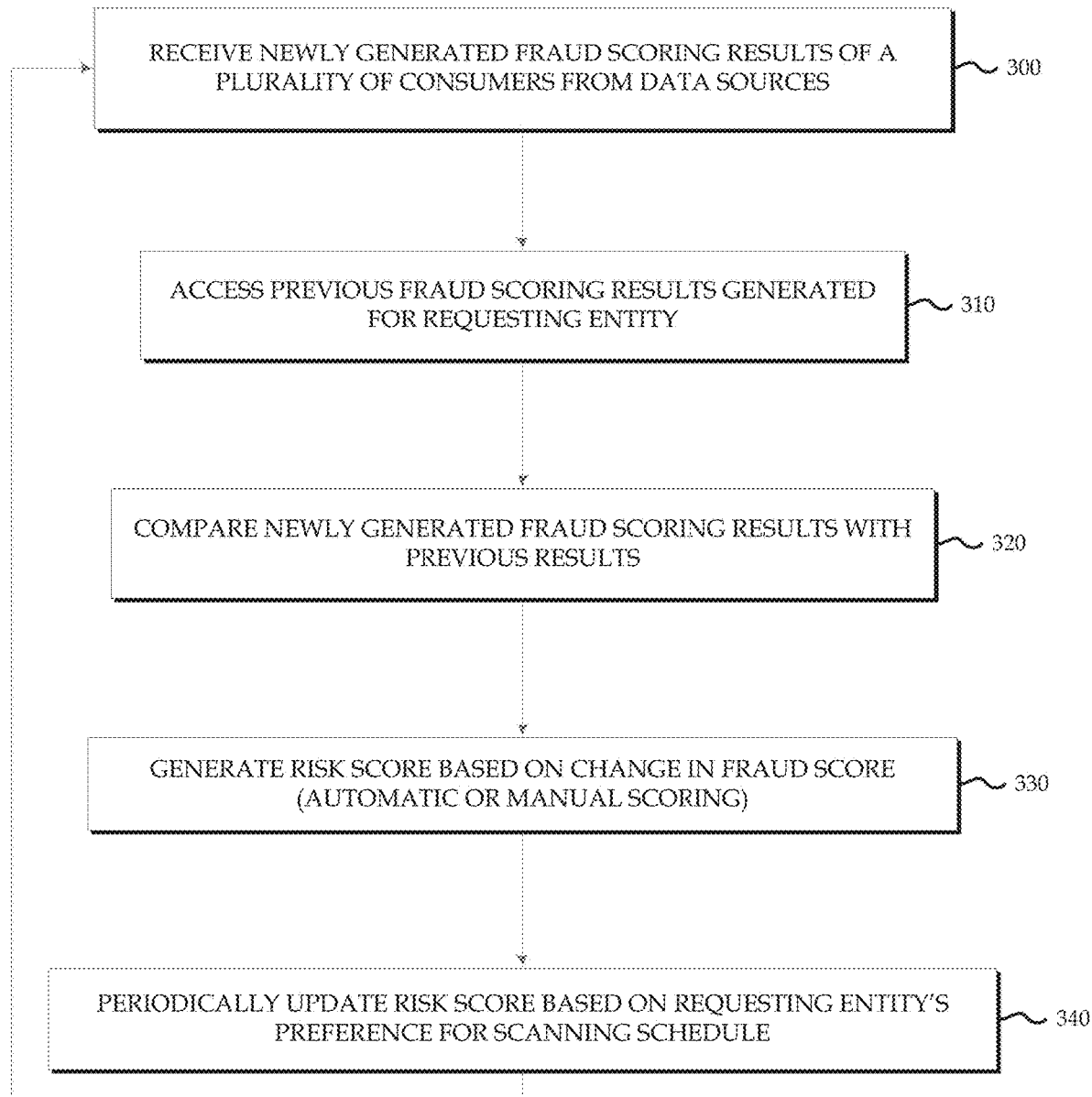
FIG. 3 is a flowchart illustrating one embodiment of a method for periodically monitoring and comparing fraud scores.

FIG. 3 is a flowchart illustrating one embodiment of a method of periodically receiving and/or determining risk scores and providing a comparative analysis of pre-breach risk to a requesting entity 110. In an embodiment, the method shown in FIG. 3 may be performed substantially in realtime so that the requesting entity 110 is presented with detailed reports containing information related to improvement in actual or potential data breaches without substantial delay. Depending on the embodiment, the method may be performed with fewer or additional blocks than are illustrated in FIG. 3. In one embodiment, the method of FIG. 3 is performed by the pre-breach system 130. However, the method may be performed by one or more other suitable computing systems, such as a computing system that includes data scanning and data breach risk scoring modules that perform similar features to those discussed with reference to the pre-breach system 130. For ease of discussion, the methods discussed below will be described with reference to the pre-breach system 130. However, the methods may be performed by any other suitable computing system.

The method of FIG. 3 describes a process of analyzing fraud risk scores for individuals on a scan list of a requesting entity and comparing the fraud risk scores of such consumers with previous fraud risk scores in order to develop a data breach risk score for a fraud risk category. The method of FIG. 3 may also be used for providing risk scores associated with other risk categories, such as by comparing a quantity of individuals for which match criteria for a particular risk category are met in a current month with a quantity met in a previous month in order to generate a risk score for the particular category.

In one embodiment, the pre-breach system 130 receives the fraud risk scores and accesses previous fraud risk scores generated for the requesting entity 110. In some embodiments, the periodically generated fraud risk scores are compared. The fraud risk scores may be compared to determine a percentage change in fraud risk scores (or other data breach categories) in each of one or more fraud risk score ranges, for example. In other embodiments, the fraud risk scores may be compared and converted into a risk score, such as a risk score that indicates a current fraud risk (e.g., cumulative across all the consumers) and/or a risk score that indicates a change in fraud risk scores over times, such as a comparison of a previous aggregate fraud risk score (e.g., average of fraud risk scores of all individuals on the scan list) with a current aggregate fraud risk score. Thus, in one embodiment, a data breach risk score for a fraud risk category may be calculated based on the change in fraud risk scores. In one embodiment, fraud risk scores are generated at least partially manually, such as by an individual. In other embodiments, fraud risk scores are generated at least partially automatically by a computing device.

In block 300, the pre-breach system 130 receives the generated fraud risk scores, such as may be provided by a third-party fraud risk scoring system, such as Experian's Precise ID, or other similar fraud risk analysis systems. In one embodiment, the pre-breach system 130 generates fraud risk scores for consumers and/or generates aggregate fraud risk scores reflecting fraud risk across a requesting entity (or at least the individuals included in the scan list from the requesting entity).

In block 310, the pre-breach system 130 accesses previous fraud risk scores for the requesting entity 110. The previous fraud risk scores may be stored locally on the pre-breach system 130, may be entered by the requesting entity 110, or may be maintained/retrieved from other sources.

In block 320, the pre-breach system 130 compares the newly generated fraud risk scores with fraud risk scores previously generated for the individuals on the scan list. For example, individuals may be segmented into fraud risk ranges, such as a low, medium, and high fraud risk range, and totals of consumers within each of the segments may be calculated. Changes in the quantity of consumers in each of the fraud risk segments may then be determined on a periodic basis in order to detect changes over time in fraud risks associated with the individuals on the scan list.

In block 330, the pre-breach system 130 generates a data breach risk score based on the change in fraud risk scores over a period of time, such as comparison of quantities of consumers within respective fraud risk score segments compared to quantities of consumers within those same fraud risk score segments in one or more months. In some embodiments, this data breach risk score can be a percentage value, rating, or another indicator.

In block 340, the pre-breach system 130 periodically updates a data breach risk score for a fraud risk category based on a frequency setting that may be selected by the requesting entity. The risk score may be provided in the form of real-time notifications (e.g., in response to detecting a change in data breach risk scores for the requesting entity 110) and/or batch reports that are periodically provided to the requesting entity 110. In one embodiment, month to month changes in the data retrieved (and or derived) may be reported, as well as (or as an alternative to) a summary of the information located and/or the raw data located. For example, month-to-month changes in fraud risk scores (e.g., changes in numbers of fraud risk scores in particular ranges) may be reported.

In one embodiment, a requesting entity can ask for a determination of whether there has been a breach rather than signing up for a month-to-month (or other periodic) comparison. Once an actual breach has been determined, the requesting entity can request that the breach be tracked to a data source which holds its employee/customer information. The requesting entity can then follow up with that source to figure out how to resolve the issue.

As noted above, the method of FIG. 3 may be performed in a similar manner to determine data breach risk scores for other data breach risk categories. For example, comparison of quantities of consumers matching criteria for respective risk categories may be compared on a period-to-period basis to determine data breach risk scores.

Sample Data Breach Risk Setup and Reporting

FIG. 4A illustrates an example user interface that allows a requesting entity 110 to select which data breach risk categories to monitor. Depending on the embodiment, different risk categories may be provided in the user interface. In the embodiment of FIG. 4A, the requesting entity is given an option to select specific risk categories (which each may be associated with one or more data sources) to include in a proactive data breach scanning service. In this embodiment, the requesting entity can select any combination of the indicated risk categories. In other embodiments, other risk categories may be provided.

In some embodiments, the risk categories may be associated with separate costs, such as cost per consumer scanned within a particular risk category. For example, the public Internet risk category scan may cost $0.02 per consumer, while a dark web scan may cost $0.04 per consumer. Thus, the requesting entity may select the most appropriate risk categories in view of costs associated with performing the scan.

In one embodiment, the cost per consumer, and/or a total cost for a particular risk category (e.g., based on the actual number of consumers in the scan list and the cost per consumer for the respective risk category) may be provided on a user interface such as that shown in FIG. 4A, e.g., so that the requesting entity can gauge a cost associated with each data category.

FIG. 4A also includes a frequency selection tool that allows the requesting entity to set a frequency at which scanning of the selected risk categories is to occur. In one embodiment, different frequencies may be selected for particular risk categories (or event for particular data sources with a risk category), such that data sources of some risk categories may be scanned more frequently than others.

FIG. 4B illustrates an example report 400 that may be provided to a requesting entity after a scan has been performed, either in an online user interface or in printed form. In this embodiment, the report includes information on each of the risk categories scanned, as well as an indication of additional available risk categories that were not scanned. In embodiment of FIG. 4B, the report indicates limited information regarding the consumer data that was located in each of the risk categories. For example, the report indicates that in public Internet risk category 30 consumer email addresses were found. In other embodiments, additional information regarding information of the consumers on the requesting entity's scan list may be provided. For example, the public Internet information may be selected (e.g., via a hyperlink) in order to access more detailed information regarding additional types of information located on the public Internet, where the information was located (e.g., specific Internet site/locations), what other information for the same individuals was located, how long information has been at those locations, etc. Similarly, more detailed information may be provided for each of the other risk categories.

In some embodiments, the report 500 includes data only in those risk categories that are scanned for the requesting entity, such as those risk categories that are selected using a user interface similar to FIG. 4A. Thus, if a particular requesting entity is not the healthcare space, that requesting entity can view a report that does not include information regarding the healthcare risk category.

Figure 5:
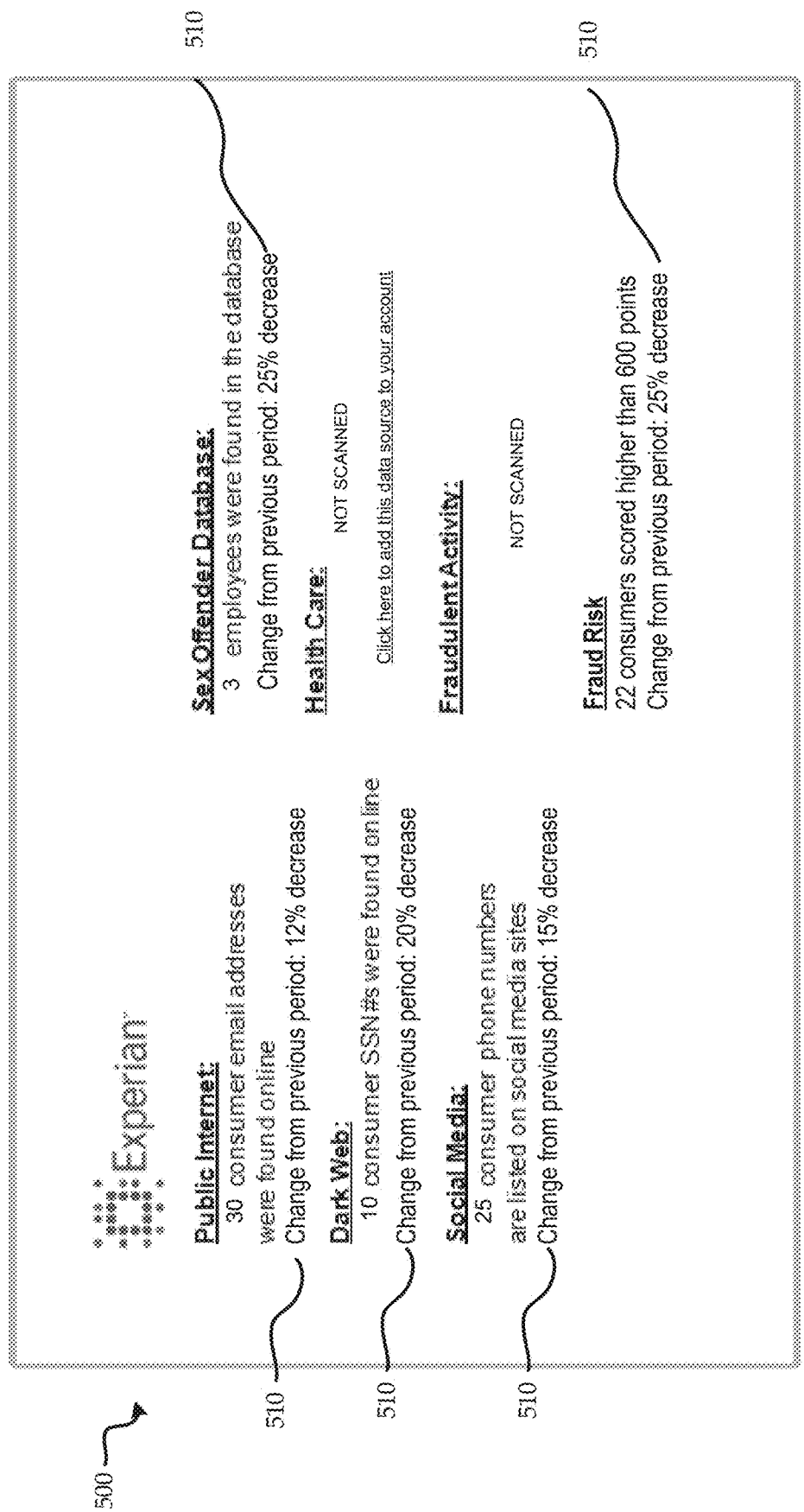
FIG. 5 illustrates an example user interface that provides the requesting entity with a summary of data breach scores for particular data breach categories, as well as a comparisons to data breach scores from a previous period.

FIG. 5 illustrates a report 500 that is similar to the report 400 of FIG. 4B, but with additional information regarding changes in located consumer information in each of the data breach categories. In particular, the example of FIG. 5 illustrates respective changes 510 of matching data points in a current period over matches located in a previous period for particular data breach risk categories. In this embodiment, the change indicators are presented in the form of percentages, but in other embodiments change information may be expressed in other manners, such as letters scores, or scores of other numerical ranges.

In other embodiments, the requesting entity 110 can customize how many previous periods or which specific periods it wishes the pre-breach system 130 to access. For example, a requesting entity can choose to view the change in its consumer information found through the public internet over a period of three month (e.g., rather than a default period of one month). In one embodiment, the user interface includes controls that allow the requesting entity to adjust the data shown to reflect less or additional data and/or to provide risk scores in different formats. Thus, the displayed data breach risk scores and/or reports may be customized by the requesting entity 110.

Figure 6:
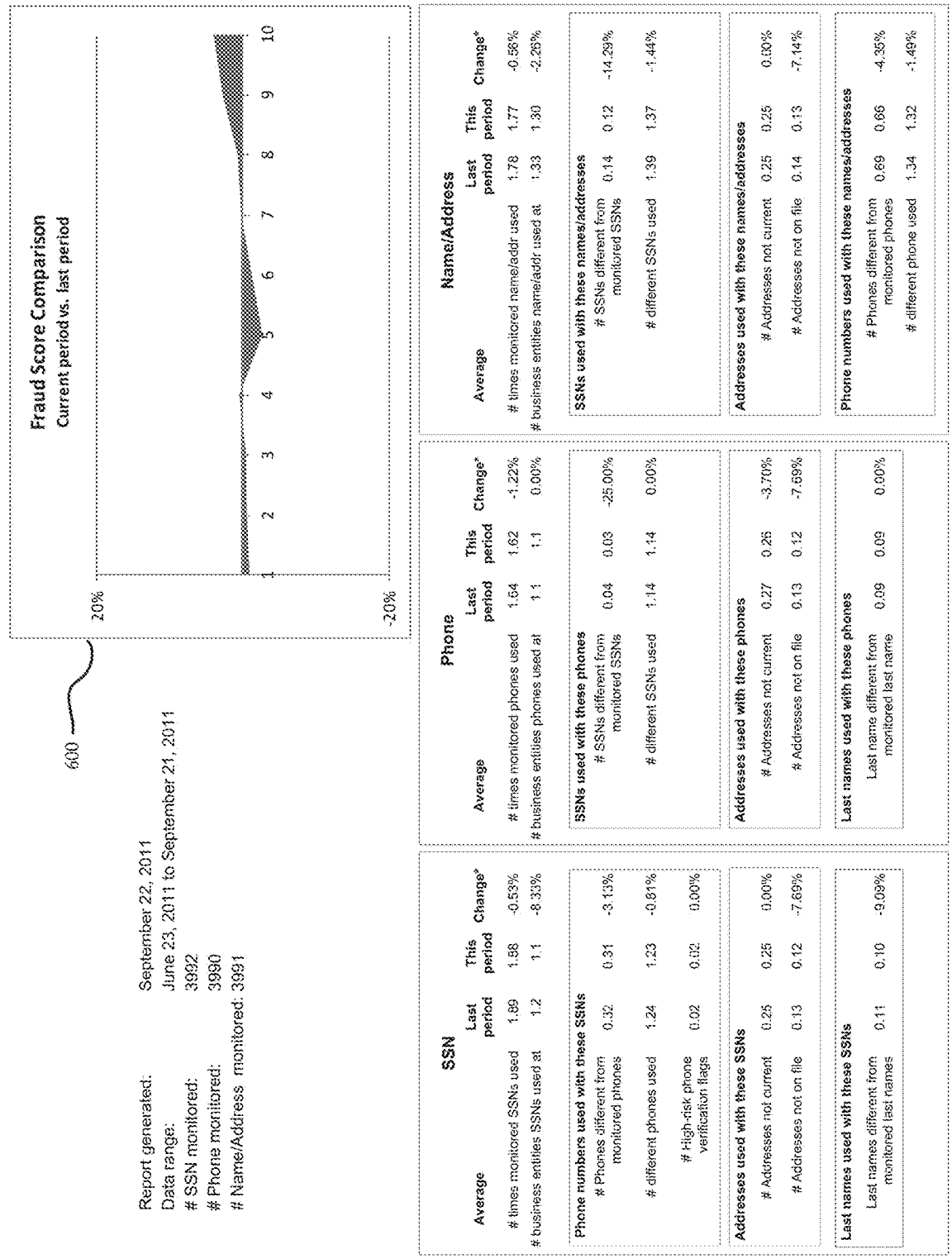
FIG. 6 illustrates detailed information regarding fraud scores of individuals associated with an entity and change in data items from a previous and current period.

FIG. 6 is a user interface that may be provided as a detailed report for a requesting entity 110 accessing its pre-data breach monitoring information. The user interface illustrated in FIG. 6 may be provided to the requesting entity 110 in response to selection of the Fraud Risk heading in a summary report, such as those of FIGS. 4B and 5. Alternatively, the user interface illustrated in FIG. 6 may be presented to the requesting entity in other manners.

In the embodiment of FIG. 6, data regarding various personal information types of consumers is indicated. In other embodiments, other information may be displayed. In FIG. 6, information regarding Social Security numbers, phone numbers, and names/addresses of consumers of individuals on the scan list is included in the user interface. The example information provides data points for a current period (e.g., "this period"), a previous period (e.g., "Last period), and a percentage change between the two periods. In this example report, information regarding social security numbers includes an average number of times each monitored social security number was used, as well as an average number of business entities at which those Social Security numbers were used. In the example data illustrated in FIG. 6, both the number of times monitored Social Security numbers were used, as well as the number of business entities at which Social Security numbers were used has decrease from the previous period, 0.53% and 8.33% respectively. Thus, this information may serve as a positive indication that any data breach means taken by the requesting entity are effective. In one embodiment, the requesting entity may obtain further information regarding information on the report, such as through one or more hyperlinks or other control means. For example, in one embodiment the requesting entity may be provided with a report listing the actual businesses at which Social Security numbers of the monitored individuals was located.

In the embodiment of FIG. 6, the Social Security number information also includes information regarding related information used with located monitored Social Security numbers. In particular, the user interface indicates a number of phone numbers different from monitored phone numbers of the corresponding monitored Social Security numbers. Thus, this data may provide an indication of Social Security numbers being used with other individuals (e.g., other phone numbers of fraudsters, for example). Similar comparisons of uses of other monitored consumer data in connection with monitored Social Security numbers is provided.

In FIG. 6, similar information to that illustrated in the Social Security number section is also provided with reference to phone number and name and address of monitored individuals. In other embodiments, other data items may be displayed in a similar manner.

In one embodiment, the results from the periodically generated fraud risk scores may be displayed on a chart 600 demonstrating the comparison of fraud risk scores in a current period compared to a previous period. In FIG. 6, the chart 600 displays a positive change in the fraud risk scores of individuals on a scan list from the requesting entity 110. In this particular chart, the vertical axis represents a percentage change in quantity of consumers with a particular fraud score, wherein fraud scores range from 1-10. Thus, the chart 600 indicates that compared to a previous period, in the current period there are about 4% less consumers that have a fraud score of 5 and about 5% more consumers that have a fraud score of 10. In this embodiment, higher fraud scores indicate decreased risk of fraud associated with the monitored individuals.

In other embodiments, fraud risk scores that are higher may indicate an increased risk of fraud. In other embodiments, changes in fraud risk scores (and/or other data breach risk scores) may be illustrated in different manners.

In other embodiments, the chart 600 may show another data breach risk category which has been selected by the requesting entity 110. Depending on the embodiment, the information provided in the chart 600 may be customized, such as by the data sources 100 scanned or the data breach risk categories selected by the requesting entity 110.

The chart 600 allows the requesting entity 110 to easily determine its progress in data breach protection and monitoring over a period of time. By examining the detailed report and the chart 600 in FIG. 6, the requesting entity 110 is able to determine that measures it has taken to prevent or remedy data breaches over a period of time are successful.

Figure 7:
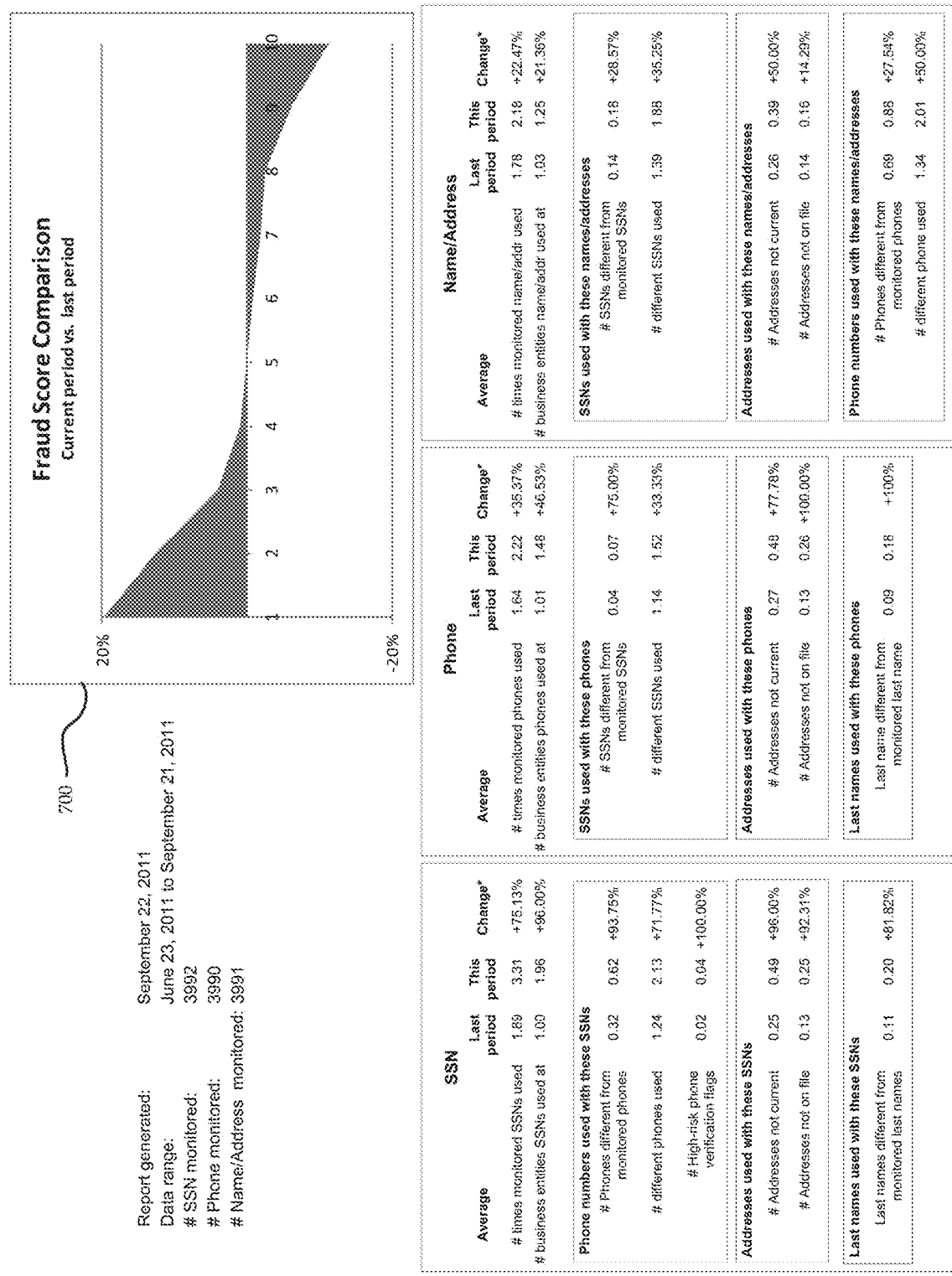
FIG. 7 illustrates detailed information regarding fraud scores of individuals associated with an entity and change in data items from a previous and current period.

FIG. 7 is a user interface that may be provided as a detailed report for a requesting entity 110 accessing its pre-data breach monitoring information. Similar to FIG. 6, the consumer information accessed and scanned by the pre-breach system 130 included social security numbers, phone numbers, names, and addresses of the requesting entity's 100 consumers.

Similar to chart 600 (FIG. 6), chart 700 illustrates comparison of data breach risk scores between a current period and previous period. In FIG. 7, the chart 700 displays a negative change in the data breach risk score of the requesting entity 110. For example, the chart 700 indicates that there is about 19% more consumers that have a fraud score of one than in a previous period, while there are about 10% fewer consumers with a fraud score of 10 than in a previous period. In this embodiment, lower fraud scores indicate an increased risk of fraud associated with the consumers. In addition, different score ranges may be used in other embodiments, such as a range from 1-999, such as is illustrated in FIG. 8, for example.

The chart 700 allows the requesting entity 110 to determine its progress in data breach protection and monitoring over a period of time. By examining the detailed report and the chart 700 in FIG. 7, the requesting entity 110 may be able to determine that measures it has taken to prevent or remedy data breaches over a period of time have not been successful. The requesting entity 110 may also be able to determine that further measures need to be taken to improve its data breach risk scores and/or preventative measures taken to protect its data.

Figure 8:
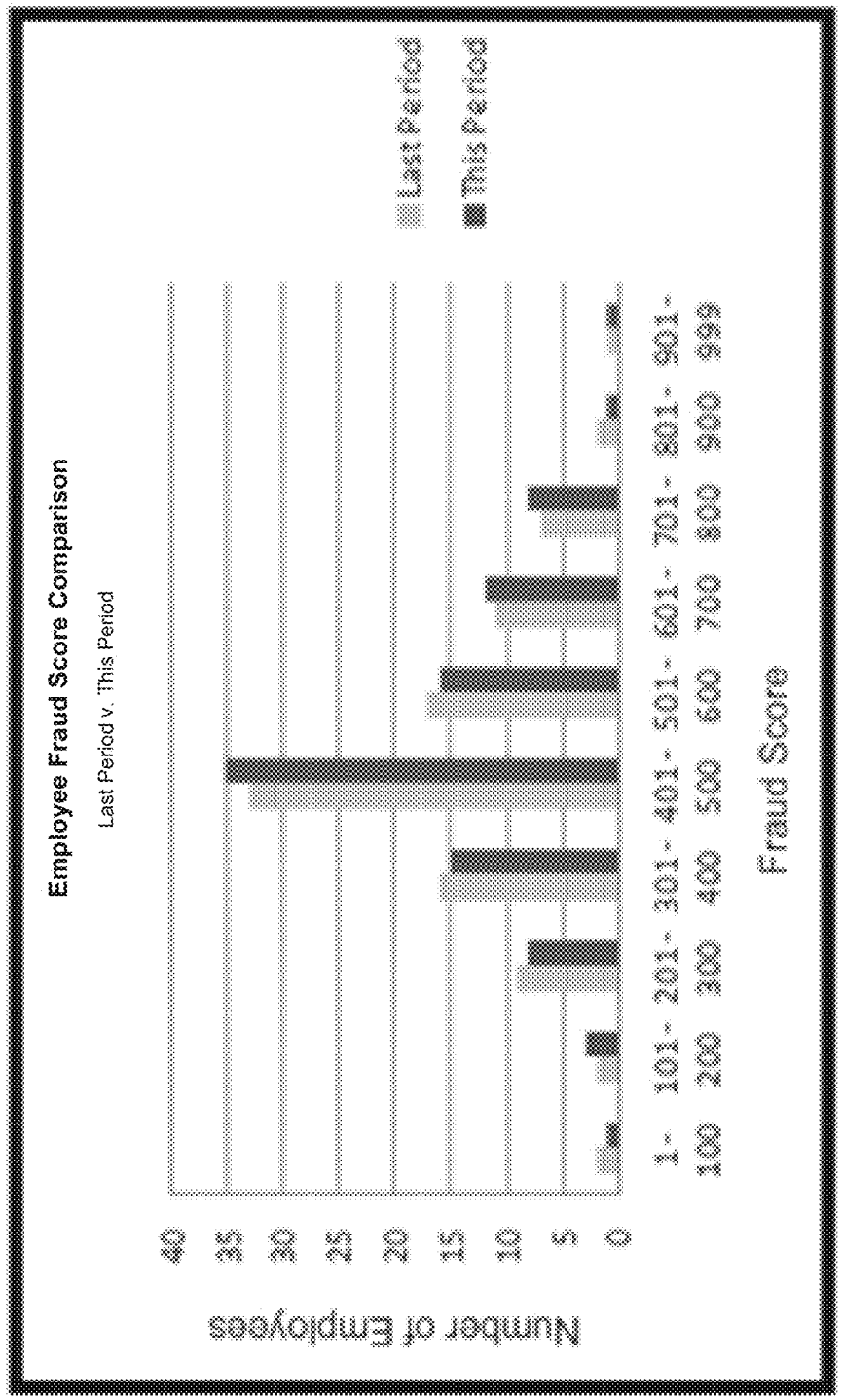
FIG. 8 illustrates an example chart comparing employee fraud scores in a previous period and a current period.

FIG. 8 illustrates a chart displaying the data breach risk scores comparing fraud risk scores for a scan list of employees. In this embodiment, the risk scores received for respective employees (e.g. from a third-party fraud scoring system) are segmented into groups each covering a range of 100. In the example of FIG. 8, the segment with the most employees is fraud scores from 401-500, with similar numbers of employees in fraud score ranges 301-400 and 501-600. Importantly, the chart of FIG. 8 illustrates changes in the quantities of employees within each of the segments from a previous period (e.g. a previous month or quarter when fraud scores were last obtained for the employees or a previous scan selected by the requesting entity). In the particular example of FIG. 8, the number of employees with fraud scores in the 401-500 range is increased in the current period, but the number of employees within fraud score ranges 501-600 and 801-900 has decreased in the current period. Depending on the embodiment, the pre-breach system 130 may generate one or more scores based on the comparison of previous and current period results. Additionally, more historical data may be provided, such as two or more previous periods being illustrated on the chart of FIG. 8.

Other types of graphics illustrating historical comparisons of fraud scores (and/or other data breach risk scores as discussed herein) may be provided also, such as a historical graph illustrating quantity of consumers within a 701-999 segment of fraud scores over a period of one year.

Figure 9A:
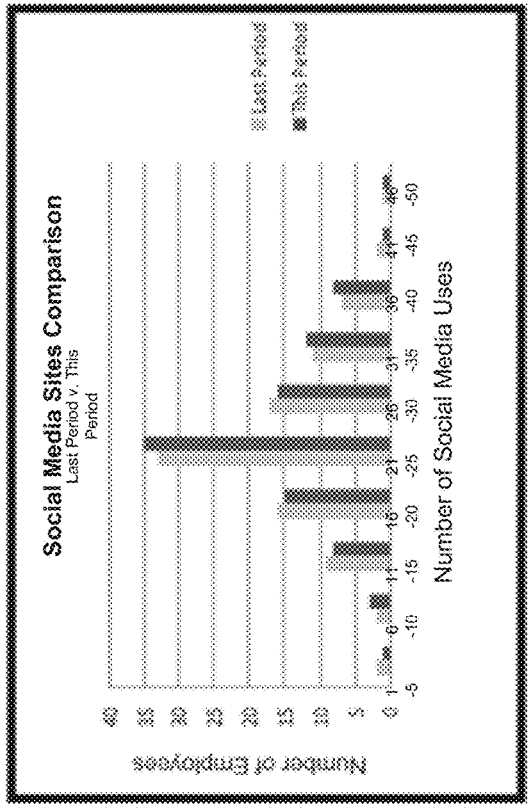
FIGS. 9A-9D are illustrative example charts comparing data associated with various data breach risk categories for two periods.

FIG. 9A-D illustrate different data breach risk category comparisons. In FIG. 9A, the chart displays the number of customers who have healthcare records available within the scanned data sources 100. This chart shows an increase in the number of customers who have healthcare records available in data sources, which demonstrates that the requesting entity 110 has either not taken measures to fix an actual data breach or the measures it has taken are not successful in preventing a breach. As shown in FIG. 9A, the number of customers having from 1-5 healthcare records identified in one or more healthcare data sources scanned by the pre-breach system has increased from 28 in the previous period to 32 in the current period. Similarly, the number of customers having 6-10 healthcare records identified increased from 25 in the previous period 230 in the current period.

Figure 9B:
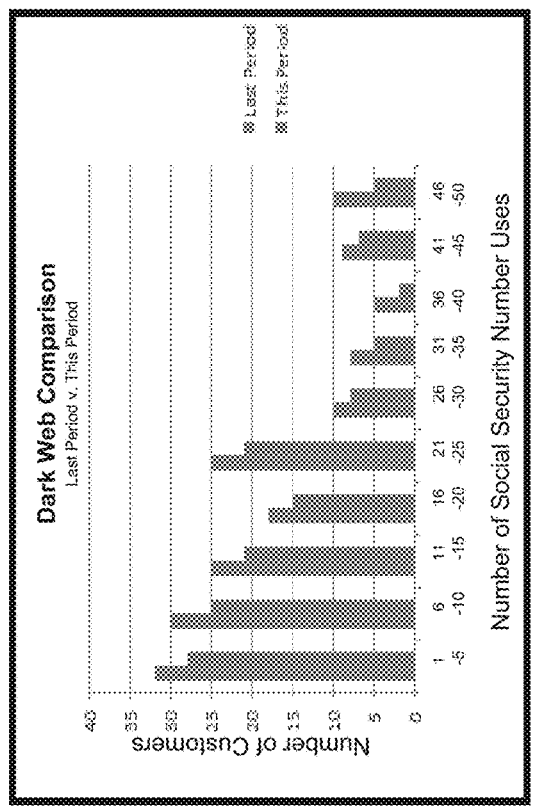

In FIG. 9B, the chart displays the number of customers who have identifying information available through social media sites within the scanned data sources 100. This chart shows an increase in the number of customers who have social media data points available in data sources 100, which demonstrates that the requesting entity 110 has either not taken measures to fix an actual data breach or the measures it has taken are not successful in preventing a breach.

Depending on the embodiment, the number of social media uses may include uses of only certain types of consumer data and/or combinations of consumer data. For example, use of a consumer's name only may not be counted as a social media use in one embodiment, while use of a consumer's name and home address (or email address, phone number, and/or other items) may be counted as a social media use. Depending on the embodiment, the requesting entity may define rules for classifying data associated with customers/employees as hits that are to be included in the reporting analysis. Thus, a first requesting entity may determine that uses of only a consumer's first and last name should be counted in social media uses, while another requesting entity may determine that uses of only a consumer's first and last name should not be counted as social media uses.

Figure 9C:
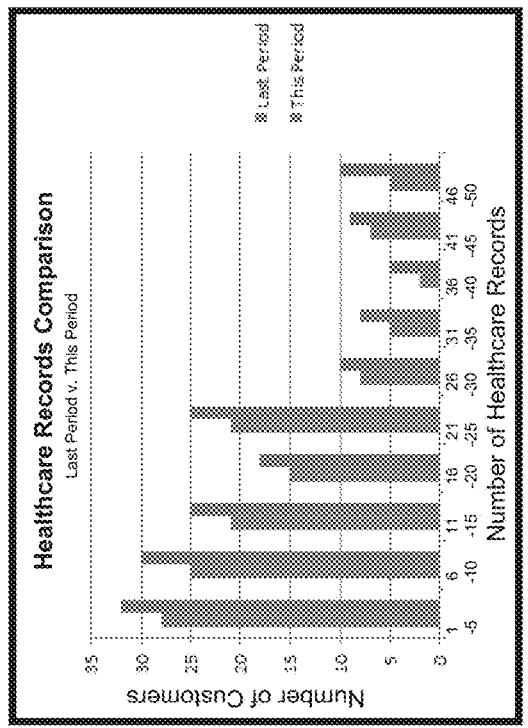

In FIG. 9C, the chart displays the number of customers who have identifying information available through the public internet within the scanned data sources 100. This chart shows an increase in the number of customers who have public internet search data points available in data sources 100, which demonstrates that the requesting entity 110 has either not taken measures to fix an actual data breach or the measures it has taken are not successful in preventing a breach.

Figure 9D:
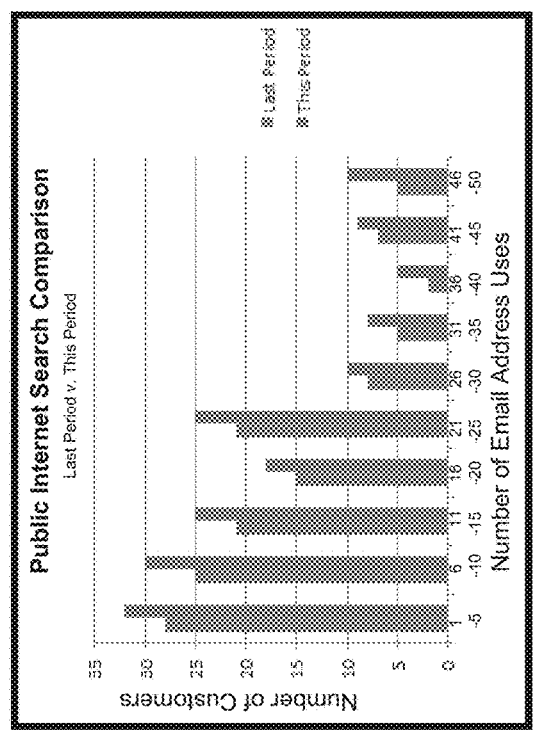

In FIG. 9D, the chart displays the number of consumer social security number uses found within the data breach category of the Dark Web. This chart shows an increase in the number of customers who have Dark Web data points available in data sources 100, which demonstrates that the requesting entity 110 has either not taken measures to fix an actual data breach or the measures it has taken are not successful in preventing a breach.

As noted above with reference to FIG. 9B, the criteria for counting location of consumer information in one or more of the data breach risk categories may be customized by a requesting entity and/or the pre-breach system.

Badges

Figure 10:
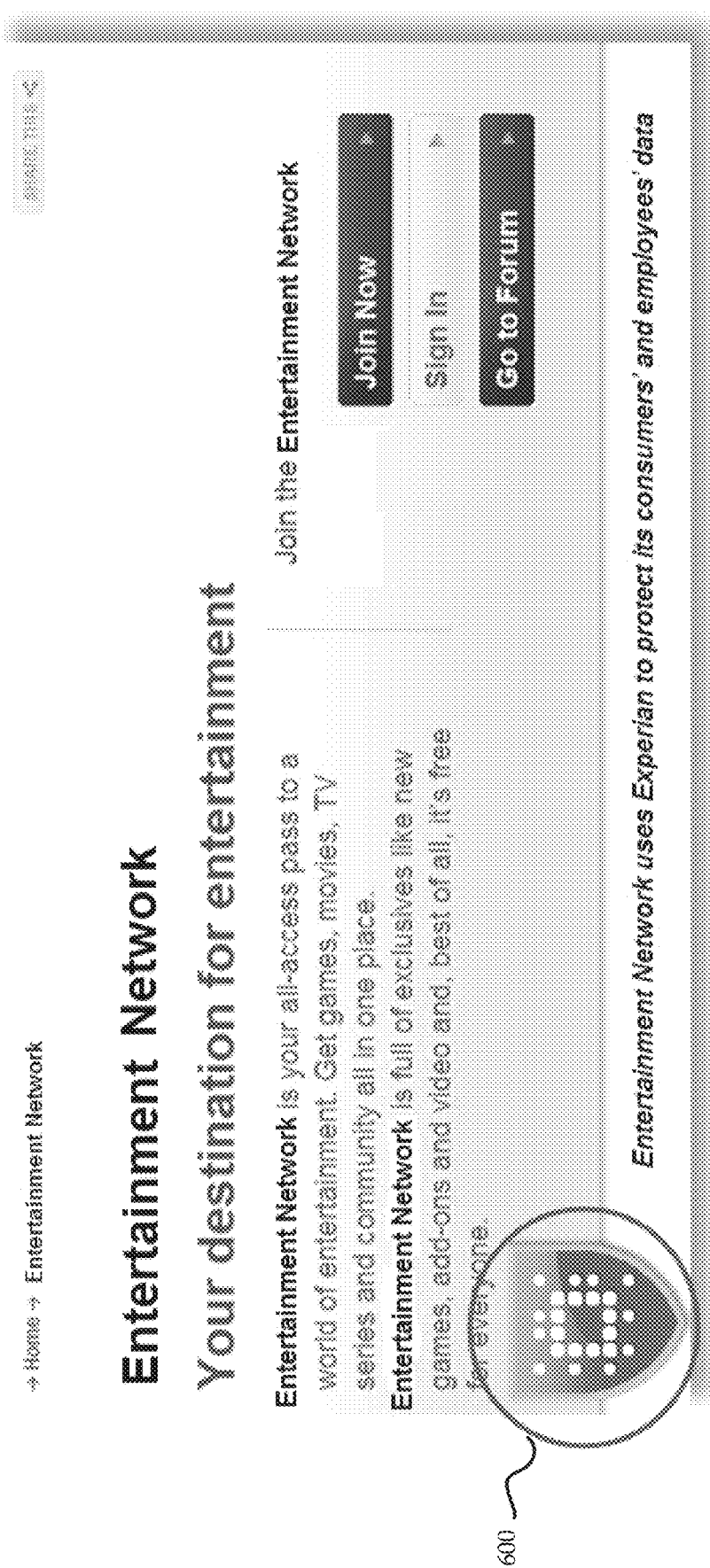
FIG. 10 illustrates an example fraud score badge placed on a requesting entity's webpage.

FIG. 10 illustrates a webpage of a requesting entity 110 that has requested and completed data breach monitoring through the pre-breach system 130. In some embodiments, once data breach risk score(s) of the requesting entity 110 are determined, it may be awarded a badge 600 corresponding to its level of active measures taken to remedy or prevent data breaches. In some embodiments, information provided by the requesting entity to a provider of the pre-breach system may be manually analyzed in order to determine if the requesting entity should be provided with a badge. For example, remediation information (e.g., steps take to resolve issues with consumer data that may have been leaked from the requesting entity) may be provided to the provider of the pre-breach system for manual (or automatic) review in determine whether a badge should be provided to the requesting entity (and possible particular badge that should be provided)

The badge 600 may also be awarded based on the change in one or more risk scores and/or overall risk scores. For example, a bronze badge may represent that the requesting entity 110 has a 5% decrease in its consumer information available within data sources 100, while a silver badge represents a 10% decrease and a gold badge represents a 20% or higher decrease. Thus, a badge may be placed on a requesting entity's website and/or other marketing materials, in order to signify that the requesting entity is taking appropriate care in monitoring for potential breaches of its customers and/or employees personal data.

In one embodiment, determining whether a badge should be provided to a requesting entity, or which badge should be provided, may be based on a comparison of risk scores of the requesting entity to risk scores of other entities, such as entities within the same or similar vertical market, having a similar number of employees, within a similar geographic region, or the like. For example, a relatively high public internet risk score for a particular requesting entity may not have a negative impact on the determination of a badge to provide to the requesting entity if the risk score is much lower than public internet risk scores for other entities within the same vertical market. Similarly, a low overall risk score for an entity (e.g., based on multiple category risk scores) may weigh against award of a badge if that low overall risk score is higher than overall risk scores for similar types of companies (e.g., similar vertical market).

Badges may encourage additional engagement by customers in view of a perceived sense of security provided by the requesting entity proactively monitoring for potential data breaches that is expressed by be badges. In some embodiments, qualifications for having a badge on a requesting entity's website may need to be periodically confirmed, such as in response to a monthly or quarterly scanning of data sources against the requesting entity's customer list and/or providing information to the provider of the pre-breach system regarding steps taken to reduce data breaches.

In one embodiment, the badge icon is obtained via a hyperlink to the data breach entity, which provides the appropriate badge for placement on the webpage when accessed by a consumer in view of most recent data breach risk scores (e.g. in comparison with previous data breach risk scores of the requesting entity). Thus, in this embodiment the level of actions taken by the requesting entity in detecting and remediating data breaches may be updated automatically and up-to-date badges may be provided in order to further encourage consumers to interface with the requesting entity. In some embodiments, badges may be entirely revoked/removed when there has been a failure to continue taking appropriate measures to prevent or remedy data breaches. The awarding of a badge may be determined manually in part or automatically by a computing system.

FIG. 11 illustrates one embodiment of a pre-breach system 130 that is configured to provide information to businesses on potential risks of data breaches, even prior to a full-blown data breach. In the embodiment of FIG. 11, the pre-breach system 130 includes a data scanning module 165 that is configured to query one or more data providers, either local data providers or remote data providers, in order to identify consumer information of a business that has requested pre-breach processing. As shown in FIG. 11, a requesting entity 110 stores, either locally or remotely, information of customers (in customer data store 105) and/or information of employees (in employee data store 115). Such information may be susceptible to data breaches. However, until a data breach has occurred, the requesting entity 110 may have no idea how likely it is that its customers and/or employees information may be fraudulently accessed.

The pre-breach system of FIG. 11 includes three modules that are configured to provide early breach notifications to businesses. First, a data scanning module 165 is configured to receive data from and/or otherwise scan data sources for information regarding customers of the requesting entity 110 in order to identify indications of potential data breaches of the business' data. In one embodiment, the business provides the data scanning module 165 with information regarding customers so that the data scanning module 165 can identify potential misuses of those customers information. Consumer information may include, for example, one or more of: Last Name, First Name, Middle Name, Generation Code, Social Security Number, Date of Birth, Phone Number, Drivers' License, State, Drivers' License Number, Street Address, City Name, State, Zip Code, account number or other custom data associated with an account of the consumer with the requesting entity, Credit card number, credit data, Email, and/or any other data. The data scanning module 165 may then scan multiple data sources, including public and/or private data sources, to identify possible leaks of the consumer information that is indicative of an actual or potential data breach. Scanning may be performed on employee data in a similar manner.

The data breach risk score module 150 is configured to generate data breach risk scores for customers of the requesting entity 110, such as based on information provided by the requesting entity 110 regarding customers (and/or employees) and/or additional information (e.g., credit data) obtained regarding those individuals. In one embodiment, fraud risk scores (which may be used in generation of a data breach risk score for a fraud category) are provided by Experian's Precise ID product and/or are similar to those data breach risk scores.

The report generation module 145 analyzes the data of the data scanning module 165 and/or the data breach risk score module 150 and generates one or more reports to the requesting entity 110. Reports may be in the form of real-time notifications (e.g., in response to detecting a change in data breach risk for the requesting entity 110) and/or batch reports that are periodically provided to the requesting entity 110. In one embodiment, month to month changes in the data retrieved (and or derived) may be reported, as well as (or as an alternative to) a summary of the information located and/or the raw data located. For example, month-to-month changes in data breach risk scores (e.g., changes in numbers of data breach risk scores in particular ranges) may be reported.

Example Computing System

The pre-breach system 130 includes, for example, a personal computer that is IBM, Macintosh, or Linux/Unix compatible or a server or workstation. In one embodiment, the pre-breach system 130 comprises a server, a laptop computer, a cell phone, a personal digital assistant, a kiosk, or an audio player, for example. In one embodiment, the exemplary pre-breach system 130 includes one or more central processing unit ("CPU") 155, which may each include a conventional or proprietary microprocessor.

The pre-breach system 130 further includes one or more mass storage devices 135, such as a hard drive, diskette, solid state drive, or optical media storage device. Typically, the modules of the pre-breach system 130 are connected to the computer using a standard based bus system. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of the locator system 100 may be combined into fewer components and modules or further separated into additional components and modules.

The pre-breach system 130 is generally controlled and coordinated by operating system software, such as Windows XP, Windows Vista, Windows 7, Windows Server, Unix, Linux, SunOS, Solaris, or other compatible operating systems. In Macintosh systems, the operating system may be any available operating system, such as MAC OS X. In other embodiments, the pre-breach system 130 may be controlled by a proprietary operating system. Conventional operating systems control and schedule computer processes for execution, perform memory management, provide file system, networking, I/O services, and provide a user interface, such as a graphical user interface ("GUI"), among other things.

The pre-breach system 130 may include one or more commonly available input/output (I/O) devices and interfaces 160, such as a keyboard, mouse, touchpad, and printer. In one embodiment, the I/O devices and interfaces 160 include one or more display devices, such as a monitor, that allows the visual presentation of data to a user. More particularly, a display device provides for the presentation of GUIs, application software data, and multimedia presentations, for example. The pre-breach system 130 may also include one or more multimedia devices 140, such as speakers, video cards, graphics accelerators, and microphones, for example.

In the embodiment of FIG. 11, the I/O devices and interfaces 160 provide a communication interface to various external devices. In the embodiment of FIG. 11, the pre-breach system 130 is electronically coupled to a network 120, which comprises one or more of a LAN, WAN, and/or the Internet, for example, via a wired, wireless, or combination of wired and wireless, communication link. The network 120 communicates with various computing devices and/or other electronic devices via wired or wireless communication links.

According to FIG. 11, information is provided to the pre-breach system 130 over the network 120 from one or more data sources 100. The data sources 100 may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In the embodiment of FIG. 11, the pre-breach system 130 also includes modules 145, 150, and 165 that may be stored in the mass storage device 135 as executable software codes that are executed by the CPU 155. These modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 11, the pre-breach system 130 is configured to execute the modules 145, 150, and 165 in order to monitor online data to predict or determine a risk of data breach, as well as any other functionality described elsewhere in this specification.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the pre-breach system 130, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

What is claimed is:

1. A computer-implemented method of monitoring online data to predict risk for data breach, the method comprising:
    receiving a scan list comprising information regarding a plurality of individuals;
    periodically automatically scanning a plurality of data sources for information regarding the plurality of individuals on the scan list, wherein the plurality of data sources that are automatically scanned include dark web data sources that are accessible via particular browsing software, wherein automatically scanning the dark web data sources comprises:
        executing a particular browser that is configured to access dark address space that is not accessible via a standard browser configured to access public internet data sources; and
        scanning at least a subset of the dark address space accessed via execution of the particular browser for at least a portion of data regarding the plurality of individuals on the scan list;
    identifying a quantity of located data regarding the individuals across the plurality of data sources;
    determining a difference between the quantity of located data and a quantity of located data identified in one or more previous scans of the plurality of data sources;
    generating a data breach risk score based at least in part on the differences between the quantity of located data and the quantity of located data identified in the one or more previous scans; and
    in response to determining that the difference between the quantity of located data and the previous quantity of data exceeds a threshold, providing a notification of a potential data breach.

2. The computer-implemented method of claim 1, wherein the plurality of individuals are associated with a company.

3. The computer-implemented method of claim 1, wherein the plurality of data sources further comprise the public internet data sources.

4. The computer-implemented method of claim 1, wherein the dark web data sources are only accessible via the particular browsing software.

5. The computer-implemented method of claim 1, wherein the notification comprises a data breach fraud score over time.

6. The computer-implemented method of claim 1, wherein identifying the quantity of the located data is for each of a plurality of data breach risk categories, and determining the difference is for each of the plurality of data breach risk categories.

7. The computer-implemented method of claim 6, wherein the data breach risk categories include at least one of: public internet, dark web, social media sites, sex offender databases, heath care, fraudulent activity sites, or fraud risk score.

8. The computer-implemented method of claim 1, wherein the method further comprises:
periodically automatically scanning the plurality of data sources with respect to other individuals associated with each of a plurality of other companies, wherein the plurality of other companies are similar to the company in one or more categories, the one or more categories comprising at least one of a vertical market, a number of employees, or a geographic region; and
comparing the data breach risk score for the company to data breach risk scores determined for the plurality of other companies that are similar to the company.

9. The computer-implemented method of claim 1, wherein the method further comprises: tracking the potential data breach to a particular data source holding a portion of data associated with one or more of the individuals on the scan list.

10. The computer-implemented method of claim 1, wherein the method further comprises: tracking the potential data breach over time, and in response to determining that a change to the data breach risk score exceeds a threshold, generate another notification indicative of the change.

11. The computer-implemented method of claim 10, wherein generating a data breach risk score comprises applying weights to different categories of information.

12. A computing system comprising:
memory; and
a hardware processor configured to execute computer-executable instructions to:
receive a scan list comprising information regarding a plurality of individuals;
periodically automatically scan a plurality of data sources for information regarding the plurality of individuals on the scan list, wherein the plurality of data sources that are automatically scanned include dark web data sources that are accessible via particular browsing software, wherein automatically scanning the dark web data sources comprises:
executing a particular browser that is configured to access dark address space that is not accessible via a standard browser configured to access public internet data sources; and
scanning at least a subset of the dark address space accessed via execution of the particular browser for at least a portion of data regarding the plurality of individuals on the scan list;
identify a quantity of located data regarding the individuals across the plurality of data sources;
determine a difference between the quantity of located data and a quantity of located data identified in one or more previous scans of the plurality of data sources;
generate a data breach risk score based at least in part on the differences between the quantity of located data and the quantity of located data identified in the one or more previous scans; and
in response to determining that the difference between the quantity of located data and the previous quantity of data exceeds a threshold, provide a notification of a potential data breach.

13. The computing system of claim 12, wherein generating the data breach risk score comprises determining a plurality of data breach category risk scores that are each associated with a different data breach risk category of the data breach risk categories.

14. The computing system of claim 13, wherein a first of the plurality of data breach risk categories is associated with the public internet data sources, and wherein a second of the plurality of data breach risk categories is associated with the dark web data sources.

15. The computing system of claim 13, wherein a third of the plurality of data breach risk categories is associated with social media sources.

16. The computing system of claim 13, wherein the data breach risk score is an average of the plurality of data breach category risk scores.

17. The computing system of claim 13, wherein a first of the plurality of data breach category risk scores is weighted more heavily in determining the data breach risk score than a second of the plurality of data breach category risk scores.

18. A non-transitory computer storage medium which stores executable code, the executable code causing a computing device to perform operations that comprise at least:
receiving a scan list comprising information regarding a plurality of individuals;
periodically automatically scanning a plurality of data sources for information regarding the plurality of individuals on the scan list, wherein the plurality of data sources that are automatically scanned include dark web data sources that are accessible via particular browsing software, wherein automatically scanning the dark web data sources comprises:
executing a particular browser that is configured to access dark address space that is not accessible via a standard browser configured to access public internet data sources; and
scanning at least a subset of the dark address space accessed via execution of the particular browser for at least a portion of data regarding the plurality of individuals on the scan list;
identifying a quantity of located data regarding the individuals across the plurality of data sources;
determining a difference between the quantity of located data and a quantity of located data identified in one or more previous scans of the plurality of data sources;
generating a data breach risk score based at least in part on the differences between the quantity of located data and the quantity of located data identified in the one or more previous scans; and
in response to determining that the difference between the quantity of located data and the previous quantity of data exceeds a threshold, providing a notification of a potential data breach.

19. The non-transitory computer storage medium of claim 18, wherein the operations further comprise:
providing a company associated with the plurality of individuals with an option to present a badge on a webpage provided by the company, the badge indicating that the company has taken measures to reduce risks of data breach in association with the periodically automatically scanning of the plurality of data sources.

20. The non-transitory computer storage medium of claim 18, wherein generating the data breach risk score comprises determining a plurality of data breach category risk scores that are each associated with a different data breach risk category of the data breach risk categories.

\* \* \* \* \*